United States Patent [19]

Black et al.

[11] 4,363,122

[45] Dec. 7, 1982

[54] MITIGATION OF NOISE SIGNAL CONTRAST IN A DIGITAL SPEECH INTERPOLATION TRANSMISSION SYSTEM

[75] Inventors: David H. A. Black, Chelsea, Canada; Robert H. Joyce, Menlo Park, Calif.; Fouad Daaboul, Verdun; Tiu Le Van, Touraine, both of Canada

[73] Assignee: Northern Telecom Limited, Montreal, Canada

[21] Appl. No.: 187,821

[22] Filed: Sep. 16, 1980

[51] Int. Cl.³ .......................... H04J 6/02; H04B 1/62
[52] U.S. Cl. ....................................... 370/81; 370/113
[58] Field of Search .................... 370/79, 80, 81, 113, 370/6; 179/1 B, 1 P, 1 D

[56] References Cited

U.S. PATENT DOCUMENTS

| | | |
|---|---|---|
| 3,197,565 | 7/1965 | Yoder et al. ........................ 370/113 |
| 3,811,014 | 5/1974 | Seitz ..................................... 370/80 |
| 3,836,719 | 9/1974 | Clark ..................................... 370/81 |
| 3,927,268 | 12/1975 | Sciulli et al. ........................ 370/80 |
| 3,945,002 | 3/1976 | Duttweiler et al. ........ 340/347 DD |
| 3,959,770 | 5/1976 | Schaefer .............................. 370/113 |
| 4,002,841 | 1/1977 | Ching et al. ........................... 370/81 |
| 4,059,730 | 11/1977 | Messerschmitt et al. ............. 370/81 |

FOREIGN PATENT DOCUMENTS

1250452 10/1971 United Kingdom.

OTHER PUBLICATIONS

"TASI füllt Gesbrächslücken", *Elektro-Technik*, vol. 45, No. 23, Aug. 1963, pp. 455-457.
"Digital Speech Interpolation Techniques", Campanella, *1978 National Telecomm'ns. Conf.*, Dec. 1978, pp. 14.1.1-14.1.5.
A Speech Predictive Encoding Communication System for Multichannel Telephony by J. A. Sciulli and S. J. Campanella, IEEE Transactions on Communications, vol. COM-21, No. 7, Jul. 1973, pp. 827-835.

*Primary Examiner*—Thomas A. Robinson
*Attorney, Agent, or Firm*—R. John Haley

[57] ABSTRACT

A DSI transmission system is described in which noise signal contrast is mitigated by transmitting not only active channels but also channels which carry background noise, the resolution of the background noise channels being varied in dependence upon the number of channels transmitted. In the described system, the DSI transmission is effected in superframes each of which consists of an overhead information frame and a plurality of digital message frames. The overhead information frame contains a word indicating the transmission status of each channel during the superframe, a code indicating the number of bits of each digital message, and maximum segment value information bits for each of the active channels which are transmitted using nearly instantaneous companding. Each of the remaining frames contains a digital message in respect of each active channel. Remaining space in these frames is occupied by digital messages in respect of the background noise channels, which are allocated to the frames by cyclic assignment and are transmitted using compact PCM encoding. For each superframe, active and background noise channels are determined using speech, echo, and off-hook detectors, and the number of bits of each digital message in the superframe is determined in dependence upon the total number of active and background noise channels.

14 Claims, 21 Drawing Figures

MITIGATION OF NOISE SIGNAL CONTRAST IN A DIGITAL SPEECH INTERPOLATION TRANSMISSION SYSTEM

This invention relates to a method of mitigating noise signal contrast in a multi-channel digital speech interpolation (DSI) transmission system, and to such a system.

A DSI transmission system is known, for example, from Ching et al. U.S. Pat. No. 4,002,841 issued Jan. 11, 1977. In such a system the bandwidth required for transmitting a plurality of digital voice signal channels via a transmission link, such as a satellite communications or submarine cable link, is reduced by detecting the presence of speech signals on each channel, to determine which channels are active at any instant, and transmitting only those channels which are currently active. The reduced bandwidth requirement results from the presence of speech inactivity times on each individual channel.

Thus in a DSI transmission system each individual channel is alternately connected via the transmission link when the channel is active, and disconnected when the channel is not active, i.e. when no speech signals are present. A significant disadvantage of this connection and disconnection, or switching, of the channel is that it gives rise to a very noticeable and subjectively annoying noise signal contrast at the receiving end of the channel. Thus when the channel is active, the receiving subscriber hears not only the speech of the transmitting subscriber but also background noise which is present in the vicinity of the transmitting subscriber and noise which is present on the transmission channel itself, whereas when the channel is not active and is therefore disconnected the receiving subscriber hears none of this noise.

In order to reduce this noise signal contrast, it is known for the receiver of the DSI transmission system to include a local noise signal generator, and to insert the locally generated noise signal on each channel during the channel's disconnected periods. However, the locally generated noise signal inevitably has different characteristics to those of the actual noise signals transmitted during each channel's active periods, and of course these actual noise signals differ very considerably from one channel to another. As a result, this insertion of locally generated noise at the receiver is not very effective in reducing the noise signal contrast.

It is also known, from Messerschmitt et al. U.S. Pat. No. 4,059,730 issued Nov. 22, 1977, to provide at the transmitter of the DSI transmission system a noise estimator and a noise signal inserter. The noise estimator produces an adaptively adjusted measure of the noise on each channel, and when the channel becomes inactive this measure is inserted by the noise signal inserter at a predetermined location within the transmitted DSI signals. At the receiver, the locally generated noise signal is adjusted in response to this adaptive noise measure, so that the locally generated noise inserted on the channel during the channel's disconnected periods more closely approximates the actual noise which is transmitted during the channel's connected periods. However, even in this case the characteristics of the actual noise and the locally generated noise differ, so that the subjectively annoying noise signal contrast still persists.

Accordingly, objects of this invention are to provide an improved method of mitigating noise signal contrast in a multi-channel DSI transmission system, and to provide an improved multi-channel DSI transmission system.

According to one aspect of this invention there is provided a method of mitigating noise signal contrast in a multi-channel digital speech interpolation transmission system, comprising the steps of: determining each channel which is active and each channel which carries background noise; transmitting the active channels; and transmitting the channels which carry background noise with a resolution which is dependent upon the number of channels transmitted and which is reduced as said number is increased.

According to another aspect this invention provides, in a multi-channel digital speech interpolation transmission system, the improvement comprising: means for determining each channel which carries background noise, in addition to each channel which is active; and means for transmitting, in addition to each active channel, each channel which carries background noise with a resolution which is dependent upon the number of channels transmitted and which is reduced as said number is increased.

The invention is thus distinguished from the prior art in two respects. Firstly, whereas in the prior art each channel is merely determined as being either active or not active, in accordance with this invention each channel is determined as being active or as carrying background noise, as distinct from neither being active nor carrying background noise. Secondly, in accordance with this invention the background noise channels are transmitted as well as the active channels. In order to enable transmission of the background noise channels, without at the same time unduly impairing the transmission of the active channels, the background noise channels are transmitted with a resolution which depends upon the number of channels transmitted. Thus in a typical operating situation of a system in accordance with this invention, the active channels are transmitted with a first resolution, or bit rate, and the background noise channels are transmitted with a second, lower, resolution or bit rate. Whilst the lower resolution of the background noise channels may result in the background noise heard by the receiving subscriber being less distinct during speech inactivity periods of the relevant channel than it is during active periods of the channel, the annoying noise signal contrast is avoided and in any event the receiving subscriber expects to hear background noise only indistinctly.

In the method of the invention said determining step preferably comprises, for each channel, the steps of: detecting speech signals on a transmit path of the channel; determining whether the channel is in an off-hook state; detecting echoes on the transmit path of speech signals on a receive path of the channel; determining that the channel is active if speech signals which are not echoes are detected on the transmit path and the channel is in the off-hook state; and determining that the channel carries background noise if speech signals are not detected on the transmit path and the channel is in the off-hook state.

Thus if a channel is in the off-hook state, if speech signals are not detected the channel is determined as carrying background noise, whereas if speech signals are detected the channel is determined as being active unless it is also determined that the detected speech signals are echoes.

Whilst the determination of whether each channel is in an off-hook state may in some cases be able to be effected by examining signalling bits, the use of common channel signalling could prevent a DSI transmission system from receiving signalling information, and accordingly it is desirable that some other method be used to determine whether each channel is in an off-hook state. Accordingly, for each channel, the step of determining whether the channel is in the off-hook state preferably comprises the steps of: detecting speech signals on the receive path of the channel; and determining that the channel is in the off-hook state in dependence upon the detection of speech signals on the transmit and receive paths during a preceding predetermined period.

For example, the occurrence of two consecutive detections of speech signals on either the transmit path or the receive path of a channel may be used as a criterion that the channel is in the off-hook state, this state lasting until the end of the predetermined period following the last occurrence of two such consecutive detections.

According to another aspect of this invention there is provided a digital speech interpolation transmission system for transmitting a plurality of digital signal channels via a transmission link, comprising: means for forming superframes each comprising a plurality of multi-bit frames; means for determining, for each superframe, which channels are active and which channels carry background noise (b.n. channels); and means for transmitting, in a normal loading situation, a digital message in respect of each active channel in each of said frames of the superframe and digital messages in respect to the b.n. channels in said frames of the superframe, the transmitting means comprising: means for determining, for each superframe, in dependence upon the numbers of active channels and b.n. channels for that superframe, numbers of bits for the digital messages of each active channel and each b.n. channel; means for producing said digital messages, each of the respective number of bits, from the digital signals of each active channel and each b.n. channel; and means for producing and transmitting, for each superframe, digital information relating to the transmission status of each channel, and the determined number of bits of each of the digital messages, in that superframe.

In such a system the determination of channels which are active and channels which carry background noise is effected once for each superframe. In dependence upon the numbers of active and b.n. channels, a determination is also made as to how the transmission for the relevant superframe will be effected. In the case of each active channel, this involves determining a number of bits which will be used for each digital message of the channel, one such digital message being transmitted for each active channel in each frame of the relevant superframe. In the case of each b.n. channel, this determination involves determining a number of bits which will be used for each digital message of the channel, and may also involve determining in which frames of the relevant superframe a digital message of the respective channel will be transmitted.

The digital information relating to the transmission status of each channel, i.e. whether the channel is transmitted as an active channel or a b.n. channel or whether it is not transmitted in the relevant superframe, and the determined number of bits of each of the digital messages, is required by a receiver of the system in order to enable proper distribution and decoding of the transmitted signals. In order to facilitate the transmission of this digital information, preferably said means for forming superframes is arranged to form each superframe with an additional, overhead information frame in addition to said plurality of frames, said digital information being transmitted in said overhead information frame of each superframe.

Whilst it is possible for different numbers of bits per digital message to be used for all the different channels which are transmitted, or for a first number of bits per digital message to be used for all the active channels and a second number of bits per digital message to be used for all the b.n. channels in one superframe, it is more convenient if all the digital messages of a superframe consist of the same number of bits. This is the case in a preferred embodiment of the invention described hereinafter.

Accordingly, the means for determining numbers of bits for the digital messages preferably serves to determine a number of bits which is common to all of the digital messages in the relevant superframe, whereby a predetermined number of the digital messages each with the determined number of bits can be transmitted in each of said plurality of frames of the relevant superframe, said predetermined number being greater, in a normal loading situation, than the number of active channels, and the means for transmitting the digital messages comprises means for transmitting the digital message of each active channel in each of said plurality of frames of the relevant superframe and for transmitting the digital messages of b.n. channels in the remaining available space in each of said plurality of frames, the transmission being effected cyclically for the b.n. channels throughout said plurality of frames of the relevant superframe.

Thus in this case, in a normal loading situation, in each frame of the relevant superframe, other than the additional overhead information frame, a digital message is transmitted in respect of each active channel and in respect of one or more b.n. channels, the transmission of digital messages in respect of the b.n. channels being distributed cyclically among the frames of the superframe. Thus it can be seen that whereas each active channel is transmitted with a resolution which is dependent upon the determined number of bits per digital message, in the general case where said predetermined number of the digital messages each with the determined number of bits is less than the total number of active and b.n. channels to be transmitted, each b.n. channel will be transmitted with a lower resolution which is dependent upon both the determined number of bits per digital message and this total number of channels to be transmitted. Of course, if this total number is not greater than said predetermined number, then a digital message in respect of each b.n. channel can be transmitted in each frame of the superframe.

As in any DSI transmission system, it is possible for an overload situation to arise in which there are more active channels than can be transmitted without unduly restricting the numbers of bits of each digital message of each active channel. In the present system, said means for transmitting is preferably responsive to an overload situation, in which the number of active channels is equal to or greater than the predetermined number of digital messages which can be transmitted in each of said plurality of frames with a predetermined minimum number of bits for each digital message, to transmit in the relevant superframe only said predetermined number of active channels with each digital message thereof having said predetermined minimum number of bits, b.n. channels not being transmitted in the superframe.

In order to mitigate the occurrence of overload situations, and to facilitate the production of the digital messages of the active channels with different numbers of bits, preferably the means for producing the digital messages of each active channel from the digital signals of the channel comprises a nearly instantaneous companding (NIC) encoder for encoding the digital signals of each active channel in each superframe to produce a maximum segment digital value and a plurality of NIC encoded values, each NIC encoded value constituting a respective one of the digital messages of the active channel, and the means for producing and transmitting said digital information comprises means for transmitting the maximum segment digital value of each active channel in the overhead information frame of the relevant superframe.

Thus the active channels are transmitted using NIC encoding. Whilst it would be advantageous also to transmit the b.n. channels using NIC encoding, this involves the transmission of maximum segment digital values for the b.n. channels as well as for the active channels, and generally there will be insufficient space in the overhead information frame to accommodate these extra values. In this case, therefore, the b.n. channels are preferably transmitted using compact PCM (CPCM) encoding. Thus the means for producing the digital messages of each b.n. channel from the digital signals of the channel comprises means for omitting one or more most significant magnitude bits from each digital signal to produce the respective digital message.

Whilst the use of CPCM encoding for the b.n. channels entails the loss of some information from each digital message, this is not normally a serious disadvantage. As already explained, a receiving subscriber is not concerned if he only hears background noise indistinctly. Furthermore, as background noise is generally at a significantly lower level than speech signals, the most significant magnitude bits of digital signals representing background noise will generally be zero, and they can be omitted from the transmitted information, and zero bits inserted at the receiver in their place, without any actual loss of information.

It is usually the case that the plurality of digital signal channels to be transmitted are derived from at least one source which is asynchronous to the timing of the transmission system. In this case the system preferably comprises, for each such source, synchronizing means comprising: a store; means for writing the digital signals of the channels form the source sequentially into the store; means for reading the digital signals of the channels sequentially from the store at a higher rate than that at which they are written into the store; means for producing a stuffing command when the phase of reading from the store lags the phase of writing into the store by a predetermined amount; means responsive to the stuffing command for inhibiting the sequential reading from the store of digital signals in respect of a predetermined frame of the superframe whereby said predetermined frame is stuffed; means for transmitting the stuffing command as part of said digital information to identify the superframe including the stuffed frame; and means at a receiver of the system for reconstructing the timing of the asynchronous source and responsive to the stuffing command to ignore the stuffed information in said predetermined frame.

The reconstruction of the timing of the asynchronous source is conveniently effected in accordance with the method described and claimed in copending U.S. patent application Ser. No. 187,815 filed concurrently herewith.

Preferably the means for determining which channels are active and which channels carry background noise comprises: a speech detector for detecting speech signals on a transmit path, for each channel for each superframe; an off-hook detector for determining, for each channel for each superframe, whether the channel is in an off-hook state; an echo detector for detecting, for each channel for each superframe, signals on the transmit path which are echoes of signals on a receive path; and gating means for producing, for each channel for each superframe, a signal representing that the channel is active if speech signals which are not echoes are detected on the transmit path and the channel is in the off-hook state, and a signal representing that the channel carries background noise if speech signals are not detected on the transmit path and the channel is in the off-hook state.

The speech detector and echo detector are preferably as described and claimed in copending U.S. patent applications Ser. Nos. 187,816 and 187,785, respectively, filed concurrently herewith.

The detectors are preferably responsive to an average signal for each channel, the system including means for producing, for each superframe, said average signal for each channel from the digital signals of the channel.

The invention will be further understood from the following description of a preferred embodiment thereof with reference to the accompanying drawings, in which.

Figure 13A:
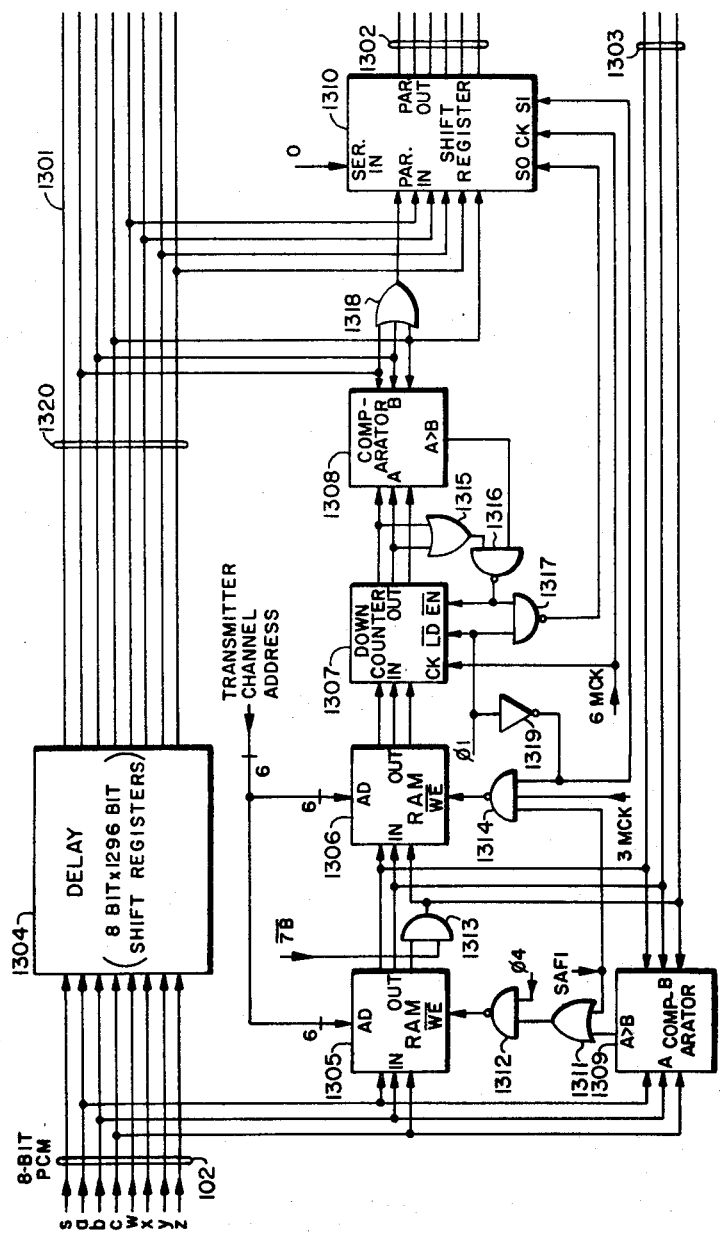
Figure 13B:
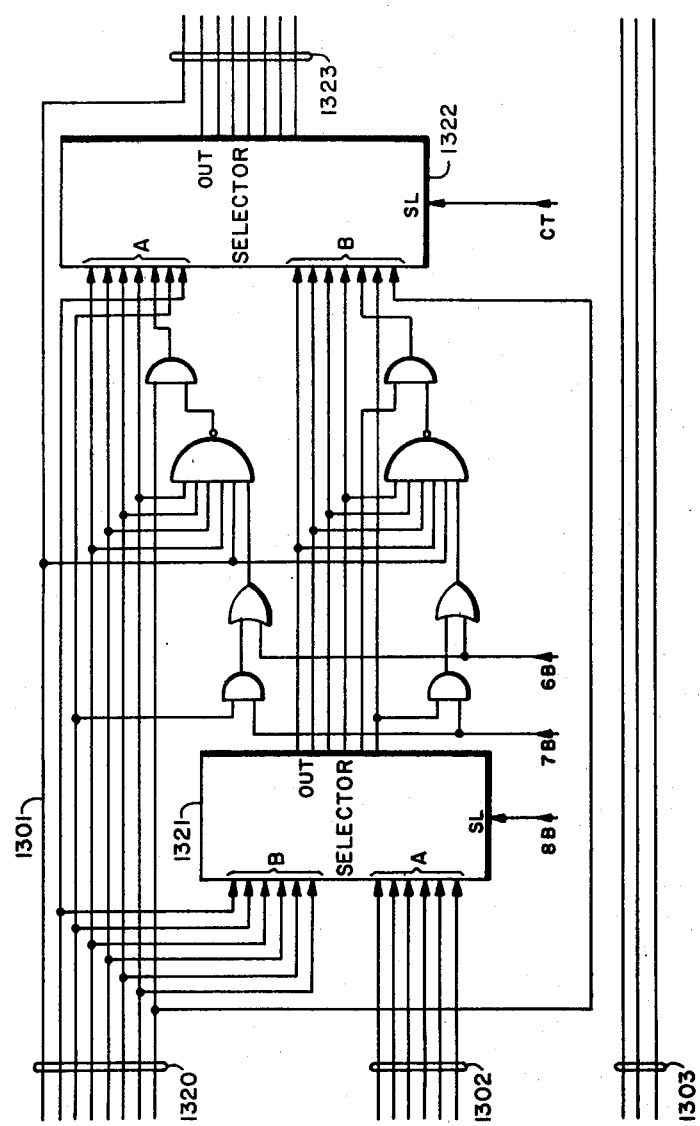
Figure 13C:
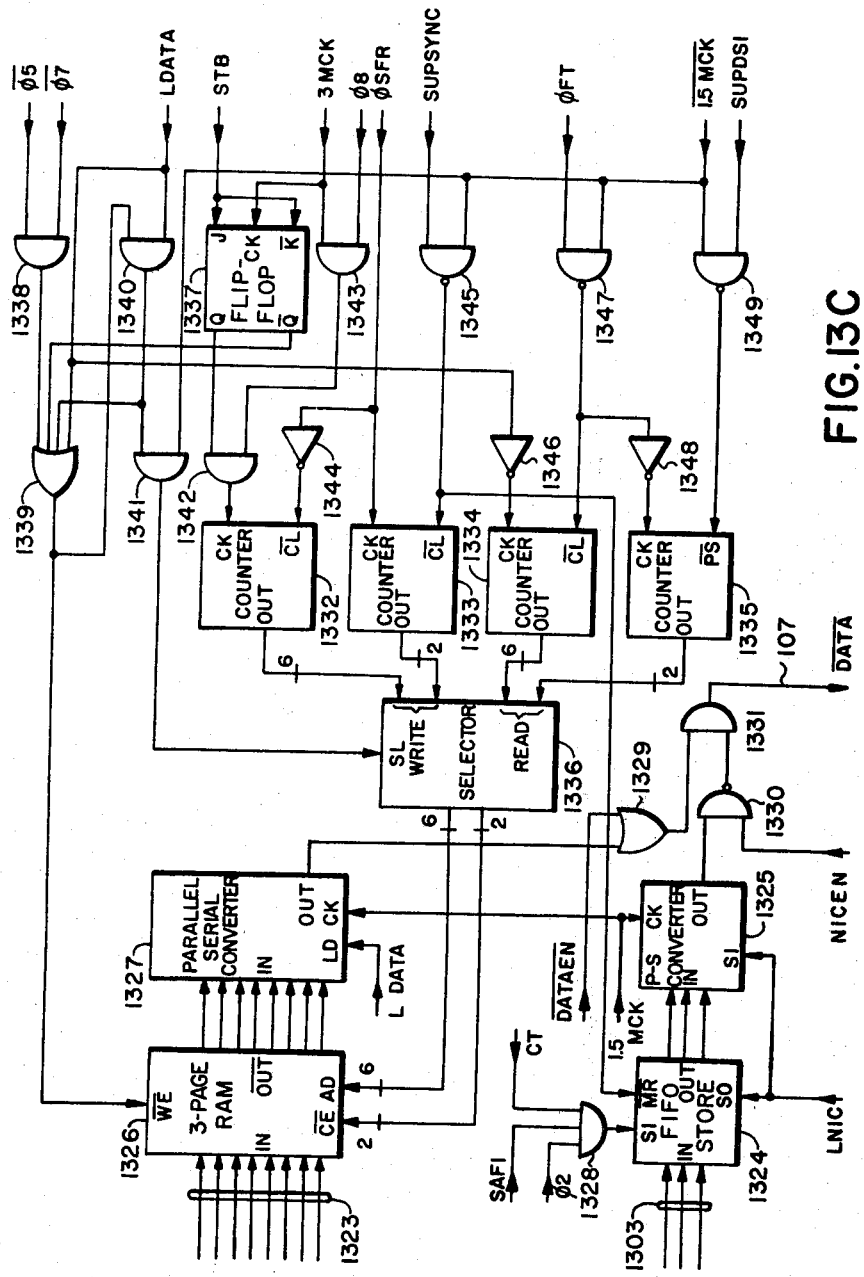
Figure 14:
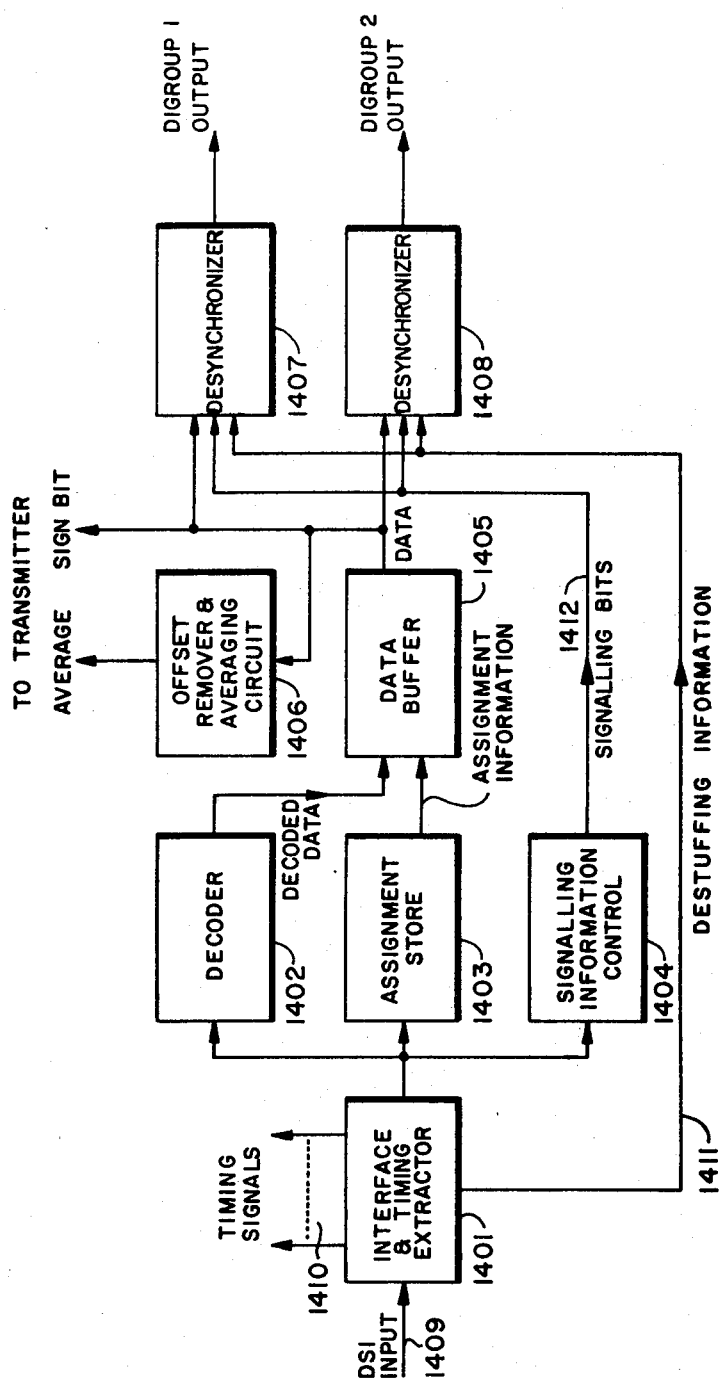

FIGS. 13A to 13C, when placed side-by-side, illustrate an encoder and buffer of the transmitter;

FIG. 14 shows a block diagram of a DSI receiver; and

Figure 15:
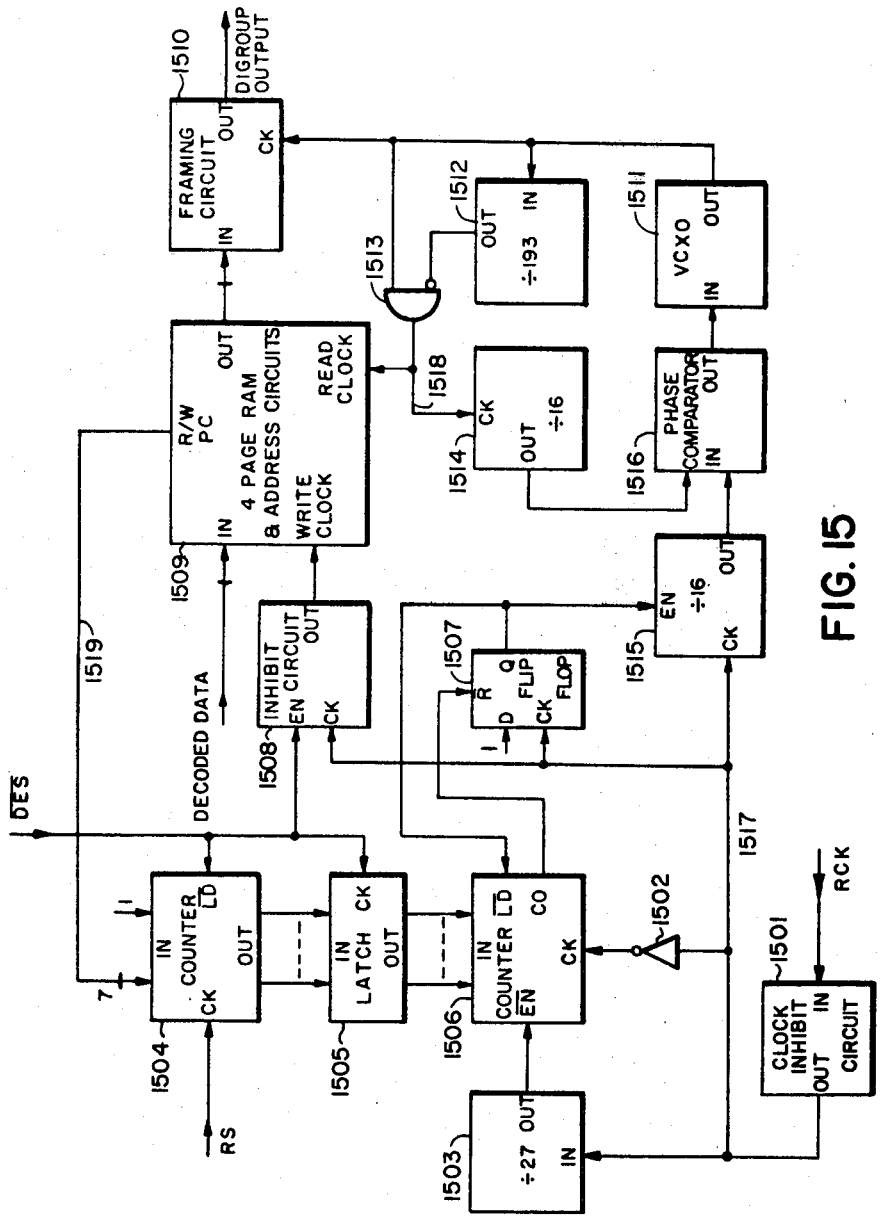

FIG. 15 illustrates parts of the receiver with reference to which synchronization and destuffing in the receiver are explained.

Before proceeding with the detailed description referring to the drawings, the overall operation of the DSI apparatus is briefly explained.

The transmitter is designed to accept two DS1 bit streams, each of which as is well known consists of frames each of 193 bits at a nominal bit rate of 1.544

Mbits/second, the 193 bits of each frame being constituted by 24 channels each of 8 bit PCM information and one synchronizing bit. After synchronization of these bit streams to the internal timing of the DSI transmitter, the 192 information bits of each frame of each bit stream are multiplexed to produce 48 channels each of 8 bits in each frame, referred to hereinafter as a sample frame. 27 such sample frames constitute a superframe of the DSI apparatus.

During each superframe, the information of each of the 48 channels is analysed and for each channel decisions are made as to whether the channel carries speech information (or data), an echo, and whether the channel (or, more particularly, the subscriber to which the channel is connected) is off-hook. If a channel is off-hook and there is no echo decision, the channel is determined to be active (i.e. carrying speech) in the presence of the speech decision and to be carrying background noise in the absence of the speech decision. Depending on the numbers of active and background noise channels, a decision is made as to how many bits will be used to transmit each 8 bit PCM word via the DSI transmission link in the next superframe. This can be 8, 7, or 6 bits depending upon the prevailing channel loading. If the decision is to transmit each word using 7 or 6 bits, then the information on the active channels is transmitted using 7 or 6 bit, respectively, NIC (nearly instantaneous companding) and the information on the background noise channels is transmitted using 7 or 6 bit, respectively, CPCM (compact PCM).

The actual transmission via the DSI link is effected at a nominal bit rate of 1.544 Mbits/second in 186-bit frames 28 of which form a superframe. The first frame in each superframe contains overhead information including the number of bits per word used for the transmission in that superframe, NIC header bits, and an assignment control word which indicates whether each channel is being transmitted 'continuously' or 'partially' in that superframe, or whether the channel is not being transmitted in the superframe. Active channels are transmitted 'continuously', which term is used herein to mean that information in respect of the particular channel is transmitted in each of the 2nd to 28th frames of the DSI superframe. In a normal loading situation, background noise channels are transmitted 'partially', which means that information in respect of the particular channel may be transmitted in only some of the 2nd to 28th frames of the DSI superframe, the particular frames being determined by cyclic assignment. In a severe underload situation some background noise channels may be transmitted continuously, in which case they are treated in the same manner as active channels. Channels which are on-hook or in respect of which there is an echo decision are not transmitted except in a very severe underload situation when some of them may be transmitted continuously (if echo decision channels are transmitted, their information is suppressed before transmission). In a severe overload situation (29 or more active channels) 29 active channels are transmitted continuously and all other channels are not transmitted. In each superframe, the channel information in any sample frame n is transmitted in the (n+1)th frame of the DSI transmission.

TRANSMITTER

Figure 1:
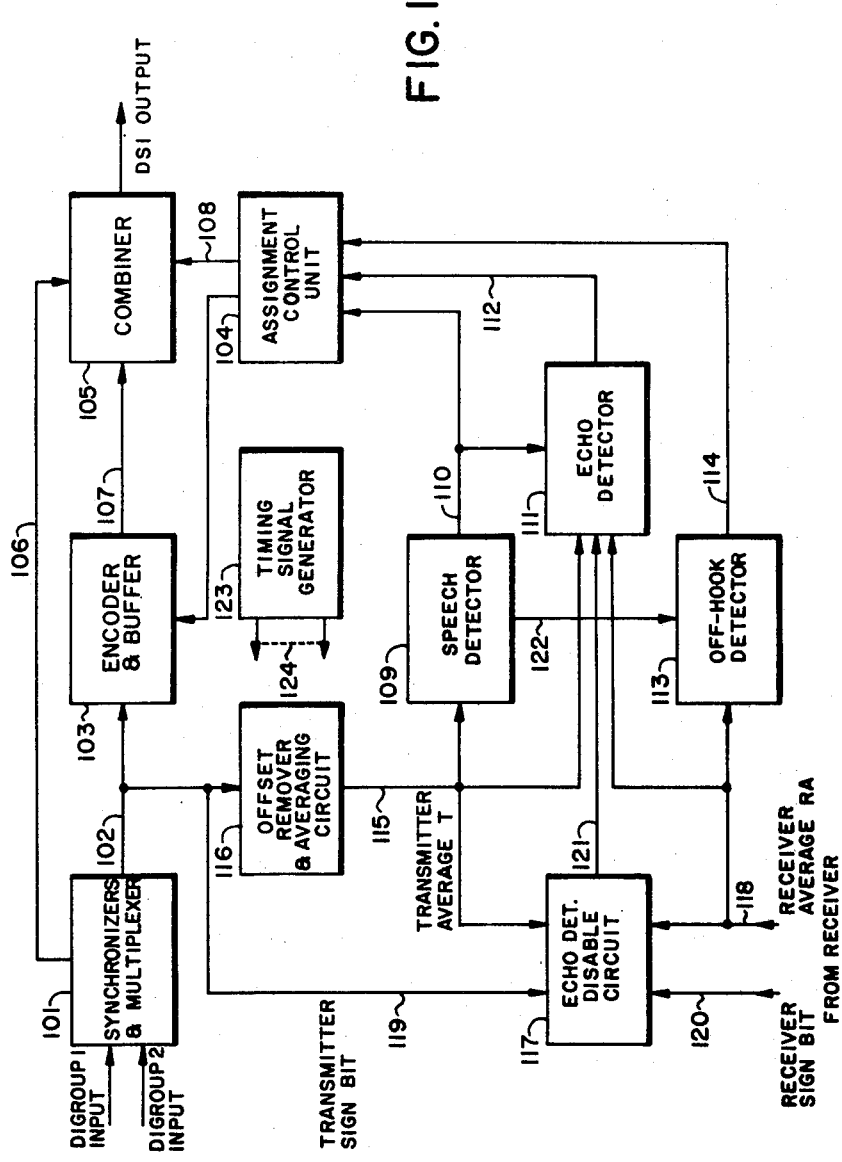
FIG. 1 shows a block diagram of a DSI transmitter.

The DSI transmitter is illustrated in FIG. 1. The two incoming DS1 bit streams, referenced digroup 1 input and digroup 2 input, are applied to a unit 101 which contains two synchronizers, one for each digroup, and a multiplexer which multiplexes the channels of the two digroups. The information contained in the 48 multiplexed channels is applied via lines 102 to an encoder and buffer unit 103 which is controlled by an assignment control unit 104. An output signal combiner 105 combines signalling and stuffing information supplied from the unit 101 via lines 106, encoded and buffered channel information supplied from the unit 103 via lines 107, and assignment and word length information supplied from the unit 104 via lines 108, into the DSI output signal for transmission via the DSI link.

The assignment control unit 104 is responsive to the speech, echo, and off-hook decisions already referred to, which decisions are supplied by respectively a speech detector 109 via a line 110, an echo detector 111 via a line 112, and an off-hook detector 113 via a line 114. The speech detector 109 is responsive to an average of the channel information, for each channel, which is produced on lines 115 by an offset remover and averaging circuit 116 to which the lines 102 are connected. This average is referred to as the transmitter average T, and is also supplied to the echo detector 111 and to an echo detector disable circuit 117. A receiver average RA, which is produced in an adjacent receiver for the opposite transmission direction as described below with reference to FIG. 14, is supplied via lines 118 to the echo detector 111, the off-hook detector 113, and the echo detector disable circuit 117. The latter circuit, in response to the averages supplied on the lines 115 and 118 and sign bits supplied thereto within the transmitter via a line 119 and from the receiver via a line 120, detects the presence of any disabling tone in either transmission direction and if any such tone is detected supplies a disabling signal to the echo detector 111 via a line 121. The echo detector 111 is also responsive to the speech decision on the line 110, and the off-hook detector 113 is also responsive to a comparison signal available from the speech detector 109 and supplied via a line 122.

Figure 2:
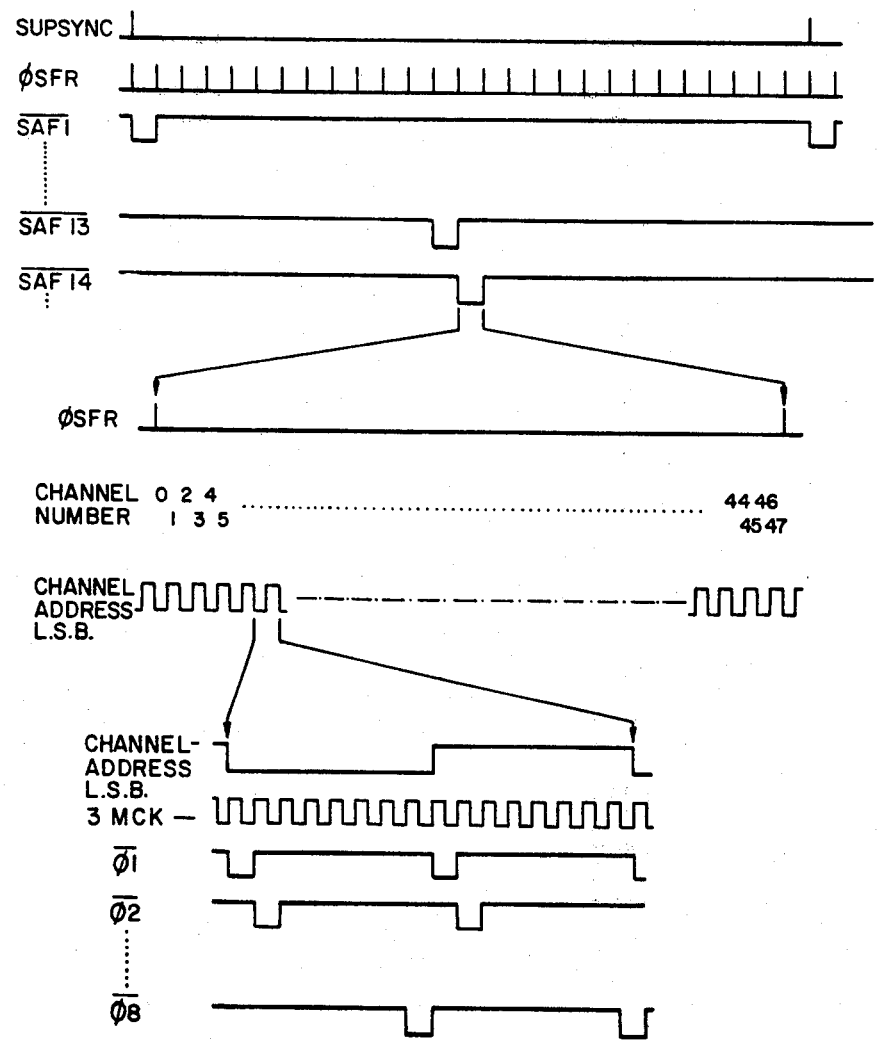
FIGS. 2 and 3 illustrate timing signals with reference to which the operation of the transmitter is explained.

The transmitter also includes a timing signal generator 123 which generates, and supplies to the various other parts of the transmitter via lines 124, timing signals and a transmitter channel address which are described below with reference to FIGS. 2 and 3. FIG. 2 relates to the internal timing of the transmitter, and FIG. 3 relates to the timing of the signals transmitted via the DSI link.

The internal timing of the transmitter is controlled predominantly by a 3.088 MHz clock signal, designated 3MCK in the drawings. The generator 123 also produces clock signals at frequencies of 6.176 MHz and 1.544 MHz, designated 6MCK and 1.5MCK respectively in the drawings. As has already been stated, in the internal timing of the transmitter superframes are formed each by 27 sample frames. Referring to FIG. 2, the start of each superframe is marked by a pulse of a signal SUPSYNC which pulse has a duration of 22 periods of the clock 3MCK, and the start of each sample frame is marked by a pulse of a signal $\phi$SFR which pulse has a duration of 1 period of the clock 3MCK. Between these pulses, in each of the 27 sample frames, there are 8 periods of the clock 3MCK for each of the 48 channels. Thus in each superframe in the internal timing of the transmitter there is a total of $22+(27-1)+27\cdot8\cdot48=10,416$ periods of the clock 3MCK. Thus each superframe has a duration of 10,416/3,088,000 seconds, or 3.373 ms.

Referring again to FIG. 2, each of the 27 superframes is identified by a respective one of signals $\overline{SAF1}$ to $\overline{SAF27}$, only the signals $\overline{SAF1}$, $\overline{SAF13}$, and $\overline{SAF14}$ being shown in FIG. 2 by way of example. In each sample frame the signal generator 123 generates a 6-bit transmitter channel address which is stepped periodically through 48 bit combinations, corresponding to the 48 channels numbered 0 through 47 in FIG. 2, during the sample frame. Thus each individual channel address, identifying one of the 48 channels, persists for 8 periods of the clock 3MCK. This is indicated in FIG. 2 by an illustration of only the least significant bit (L.S.B.) of the channel address, there being 8 periods of the clock 3MCK between consecutive changes in this bit. During each of these periods a respective one of signals $\phi 1$ through $\phi 8$ is produced, only the signals $\phi 1$, $\phi 2$ and $\phi 8$ being shown in FIG. 2 by way of example.

Figure 3:
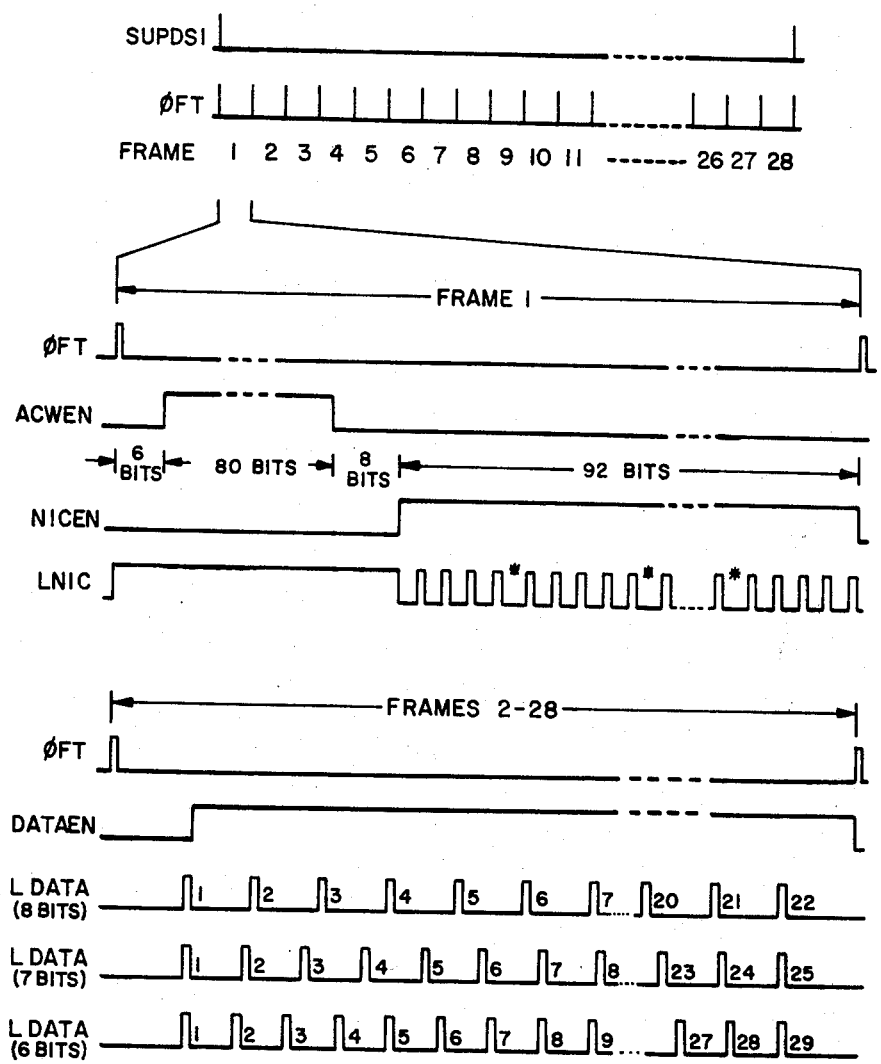

FIG. 3 illustrates timing signals relating to the transmission via the DSI link. As already stated, this transmission is effected in superframes each of 28 frames each of 186 bits, so that there are 28·186=5208 bits in each superframe at a nominal bit rate of 1.544 Mbits/second governed by the clock 1.5MCK. Thus the superframe duration is 5208/1,544,000 seconds, or 3.373 ms; i.e. the same as that for the internal timing of the transmitter. Thus the timing within the transmitter is the same as the DSI link, so that no stuffing, but only buffering, is necessary therebetween.

The superframes and frames for transmission on the DSI link are marked by signals SUPDSI and $\phi$FT respectively, shown in FIG. 3. FIG. 3 also illustrates signals ACWEN, NICEN, and LNIC which are produced in the first frame, and signals DATAEN and LDATA which are produced in each of the second through 28th frames, which are described later below.

SYNCHRONIZERS AND MULTIPLEXER

Figure 4:
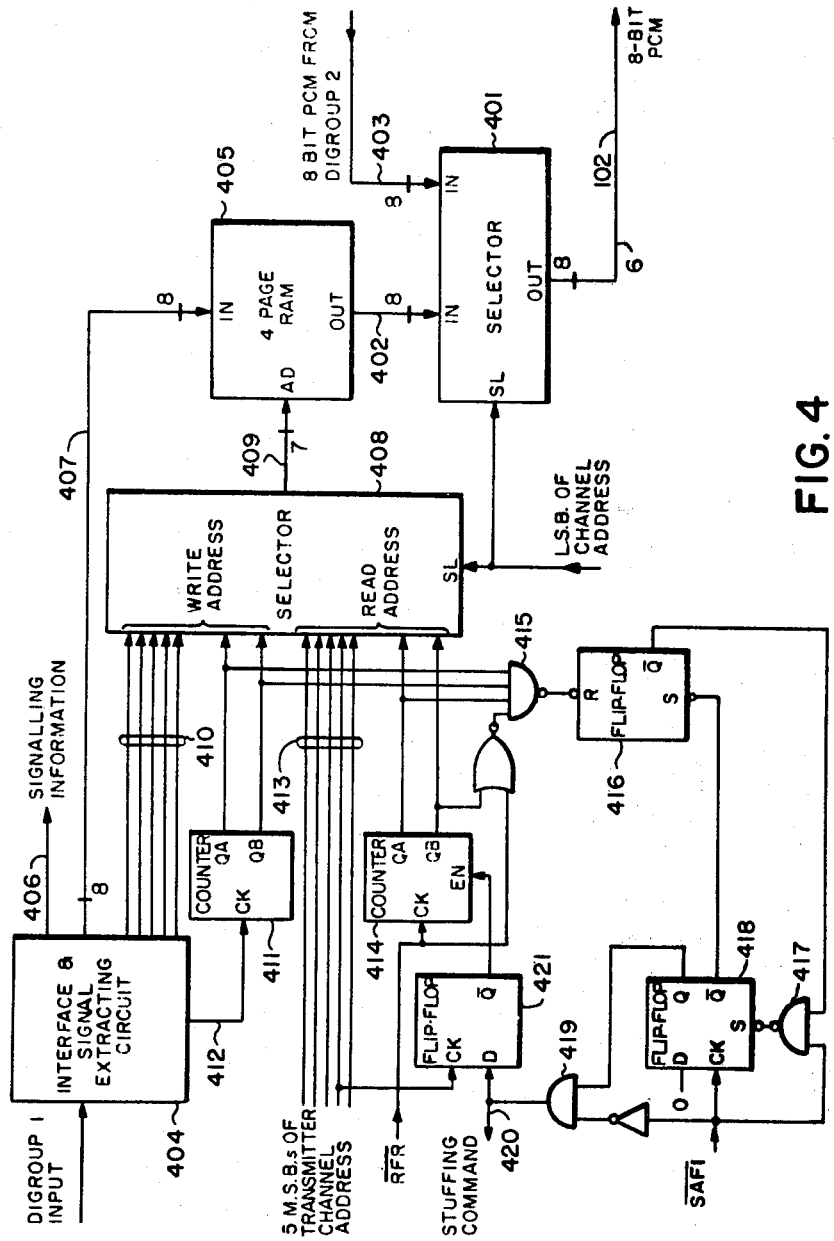
FIG. 4 illustrates a synchronizer and multiplexer of the transmitter.

FIG. 4 illustrates in more detail one of the two synchronizers, and the multiplexer, of the unit 101. The multiplexer is constituted by an 8-bit selector 401 whose inputs are connected to outputs of the two synchronizers via lines 402 and 403 and whose output is connected to the lines 102. In FIG. 4, and elsewhere in the drawings, multiple lines are indicated by a single line on which is marked a bar with an adjacent numeral indicating the number of lines; e.g. each of the 8-bit wide parallel data lines 102, 402, and 403 in FIG. 4 is represented by a single line marked with a bar and an adjacent numeral 8.

The synchronizer shown in FIG. 4 includes an interface and signal extracting circuit 404, to which the digroup 1 input is applied, and a 4-page RAM (random access memory) 405 the output of which is connected to the lines 402. The circuit 404 extracts signalling information from the incoming bit stream and supplies this via lines 406, corresponding to some of the lines 106 in FIG. 1, to the output signal combiner 105. The circuit 404 also converts the channel information of the incoming bit stream into 8-bit wide parallel PCM data and supplies this via lines 407 to the input of the RAM 405.

The RAM 405 is addressed alternately with a write address and a read address which are applied to inputs of a selector 408 whose output is connected to an address input AD of the RAM via lines 409. The selector 408 is controlled by the L.S.B. of the transmitter channel address applied to its select input SL; this L.S.B. is also applied to the select input SL of the selector 401, and is applied in inverted form to the select input of a selector, corresponding to the selector 408, in the other synchronizer to which the digroup 2 input is applied. The two synchronizers are otherwise identical. This arrangement provides that when information is being written into the RAM of one synchronizer, it is being read out from the RAM of the other synchronizer and being conducted via the multiplexer (selector 401) to the lines 102.

Each of the write and read addresses consists of a 5-bit channel address, identifying one of the 24 channels, and a 2-bit page address identifying one of the 4 pages of the RAM. Each location in the RAM 405 serves to store an 8-bit PCM word. The circuit 404 supplies the write channel address via lines 410 to the selector 408, and once every incoming frame increments a write page counter 411, whose outputs QA and QB constitute the 2-bit write page address, via a line 412 connected to the clock input CK of the counter. The read channel address is constituted by the 5 most significant bits of the transmitter channel address, supplied to the selector 408 via lines 413. The read page address is constituted by the outputs QA and QB of a read page counter 414 which, provided that it is enabled by a logic 1 at its enabling input EN, is incremented once every sample frame by a signal RFR applied to its clock input CK.

Thus 24×8=192 of the 193 bits in each frame of the incoming bit stream are written into the RAM 405. The synchronizing bit of each frame is not stored in the RAM 405. As the incoming bit stream has a nominal bit rate of 1.544 Mbits/second, the average bit rate written into the RAM 405 is 1,544,000×192/193=1,536,000 bits per second. The average bit rate read out from the RAM 405 is 3,088,000×5184/10,416=1,536,885 bits per second, because in each superframe 27·24·8=5184 bits are read out from the RAM during the 10,416 periods of the clock 3MCK. Thus read out from the RAM 405 takes place on average 885 bits per second faster than write in, so that the synchronizer must provide a positive stuff rate of 885 bits/second. In fact stuffing is effected on a frame basis, 192 bits per time, as described below, so that stuffing is effected at an average rate of 885/192=4.6 frames per second. As there are about 296 superframes per second, frame stuffing occurs on average about once every 64.5 superframes. These figures are based on nominal bit rates and clock frequencies, and in practice there is some departure from these so that frame stuffing may typically occur on average about once every 50 to 90 superframes.

In order to effect frame stuffing, the phases of the write and read addresses in the synchronizer are effectively compared by a NAND gate 415 which, when the read page approaches the write page, produces a logic 0 output which is supplied to the reset input R of a normally set flip-flop 416 to reset this flip-flop. The resulting logic 1 at the $\overline{Q}$ output of the flip-flop 416 enables a NAND gate 417 so that if or when the signal $\overline{SAF1}$ is a logic 1, i.e. other than during sample frame 1, a flip-flop 418 is set via its setting input S. The resulting logic 0 at the $\overline{Q}$ output of the flip-flop 418 returns the flip-flop 416 to its normally set state via its setting input S.

The logic 1 at the Q output of the set flip-flop 418 enables an AND gate 419 to produce a logic 1 stuffing command on a line 420, which constitutes another one of the lines 106 in FIG. 1, during the next sample frame 1. This logic 1 is also applied to the data input D of a flip-flop 421 which is clocked by the fourth most significant bit of the transmitter channel address so that its $\overline{Q}$ output becomes a logic 0. This $\overline{Q}$ output is connected to the enabling input EN of the read page counter 414, which is consequently not incremented by the next pulse of the signal RFR. In consequence, during the stuffing command in this sample frame 1 the information read out from the RAM 405 is redundant; this information appears in frame 2 on the DSI link and is ignored by the receiver. At the end of this sample frame 1, the signal $\overline{SAF1}$ becomes a logic 1 to terminate the stuffing command and to trigger the flip-flop 418 via its clock input CK, so that the Q output of the flip-flop 418 adopts the logic 0 state which is applied to this flip-flop's data input D. The logic 0 at the output of the AND gate 419 is clocked into the flip-flop 421 so that the read page counter 414 is again enabled. Thus stuffing (repetition) of one frame, of 192 bits, is accomplished.

It is observed here that the above described stuffing takes place in the place manner, but completely independently, in the other synchronizer.

OFFSET REMOVER AND AVERAGING CIRCUIT

Figure 5:
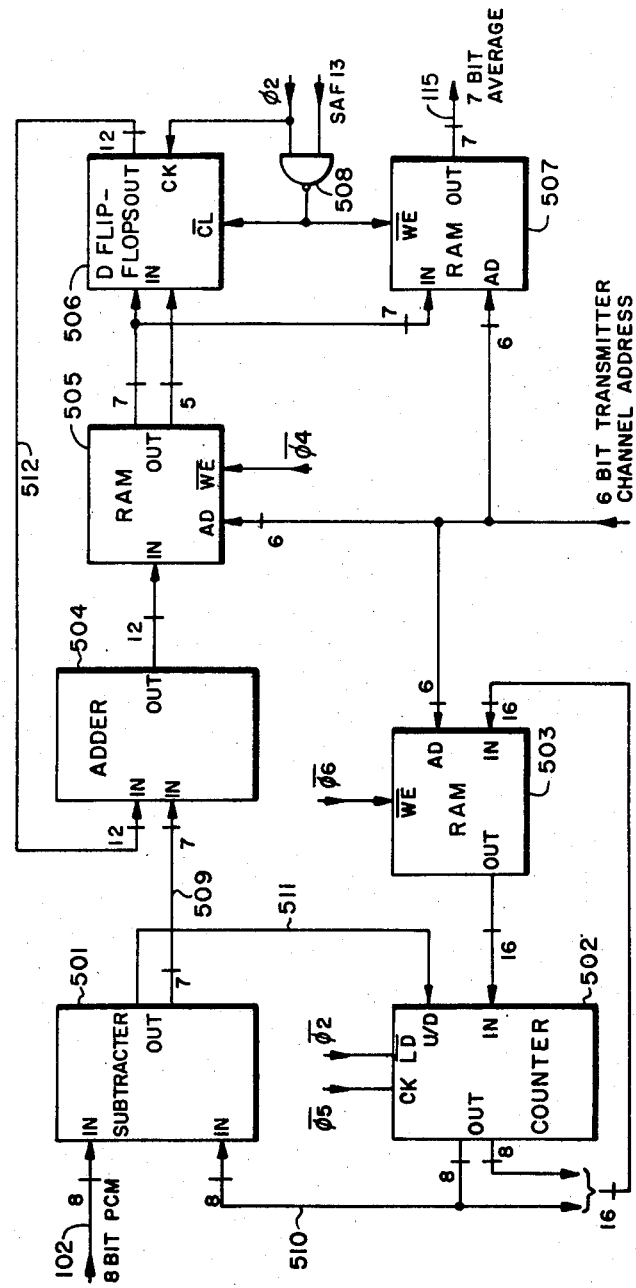
FIG. 5 illustrates an offset remover and averaging circuit of the transmitter.

FIG. 5 illustrates the offset remover and averaging circuit 116. The offset remover consists of an 8-bit subtracter 501, a 16-bit up/down counter 502, and a 48-channel by 16-bit RAM 503. The averaging circuit consists of a 12-bit adder 504, a 48-channel by 12-bit RAM 505, 12 D flip-flops 506, a 48-channel by 7-bit RAM 507, and a NAND gate 508. Each of the RAMs has a write enable input $\overline{WE}$ and an address input AD, for addressing one channel at a time, to which the 6-bit transmitter channel address is applied.

The offset remover serves to produce on lines 509 for each channel a 7-bit magnitude signal from which long-term d.c. offsets have been removed, and to this end the offset remover in operation reaches an equilibrium state in which for each channel a 16-bit offset value of the channel is stored in the RAM 503. In each sample frame, during each channel address the stored offset value of the particular channel is available at the output of the RAM, and with the signal $\overline{\phi 2}=0$ applied to a load input $\overline{LD}$ of the counter 502 is loaded into the counter and is available at the counter output. The 8 most significant bits of the offset value are applied via lines 510 to the subtracter 501, to which the 8-bit PCM channel information for the particular channel is also applied from the lines 102 of FIG. 1. The subtracter 501 subtracts the offset value bits from the channel information bits to produce the 7-bit magnitude signal on the lines 509 and a sign bit on a further output line 511. This line 511 is connected to an up/down counting control input U/D of the counter 502. The counter counts the subsequent pulse of the signal $\overline{\phi 5}$, which is applied to its clock input CK, either up or down from the initially loaded 16-bit offset value and produces a new offset value at its output. This new offset value is written into the RAM 503, in place of the old offset value, with the signal $\overline{\phi 6}=0$ applied to the $\overline{WE}$ input of the RAM. This cycle is repeated for subsequent channel addresses.

In the long term, the equilibrium state reached is such that for each channel the numbers of positive and negative sign bits produced on the line 511 are equal. Although the stored offset value of each channel varies, only the 8 most significant bits of this are subtracted from the channel information, and in fact 256 sign bits of one polarity are required in order to change the subtracted offset value bits by one step.

The averaging circuit serves to produce on the lines 115 of FIG. 1 for each channel what is termed herein the transmitter average T; in fact in order to simplify implementation of the circuit what is produced is a fraction of 27/32 of the actual average. This average T is updated with the signal $\phi 2=1$ in sample frame 13 of each superframe, in that the signals $\phi 2$ and SAF13 are supplied to the inputs of the NAND gate 508 whose output is connected to the $\overline{WE}$ input of the RAM 507 and to a clear input $\overline{Cl}$ of the flip-flops 506.

In each sample frame, for each channel, with the signal $\overline{\phi 4}=0$ applied to the $\overline{WE}$ input of the RAM 505 the output of the adder 504 is stored in the RAM 505. The adder output is equal to the sum of the 7-bit magnitude signal of the particular channel, present on the lines 509, and a 12-bit cumulative sum for the particular channel present on the lines 512. The cumulative sum for the channel is the previously stored sum for the channel, which is clocked through the flip-flops 506 with the signal $\phi 2=1$ applied to the clock input CK of these flip-flops, except in sample frame 13 when the flip-flops 506 are cleared so that the cumulative sum is zeroed. Thus with the signal $\phi 2=1$ in sample frame 13 of each superframe, for each channel, the 12-bit cumulative sum available at the output of the RAM 505 is equal to the sum of the magnitude signals for that channel during the preceding 27 sample frames. Only the 7 most significant bits of this sum are written into the RAM 507 to achieve a division of the sum by a factor of 32; hence the transmitter average T is actually 27/32 of the actual average of the channel information in the preceding 27 sample frames. However, this minor difference does not adversely affect the operation of parts of the apparatus described below.

SPEECH DETECTOR

Figure 6:
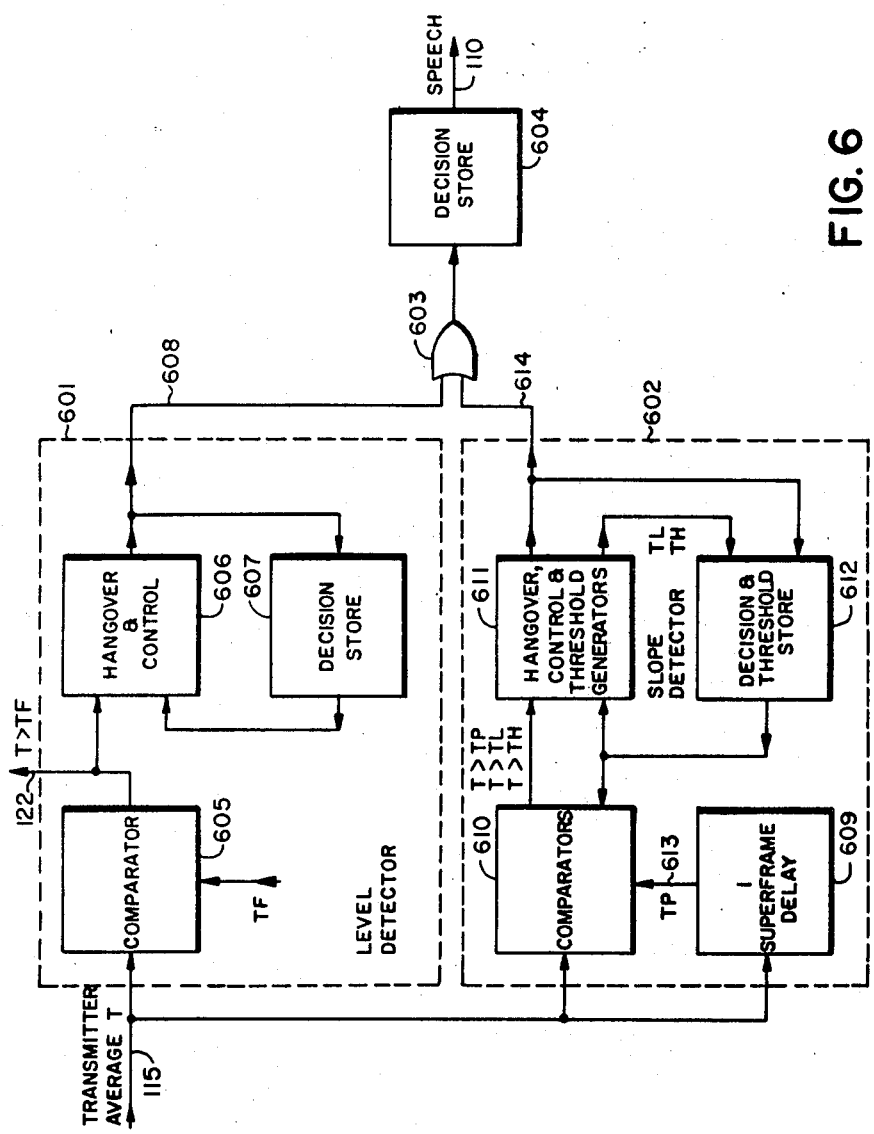
FIG. 6 illustrates in the form of a block diagram a speech detector of the transmitter.

The speech detector 109, which forms the subject of copending U.S. patent application Ser. No. 187,816 filed concurrently herewith, is illustrated in more detail in FIG. 6, and its operation is explained below with reference to the flow chart in FIG. 7 and the signal level diagram in FIG. 8.

The speech detector includes two independent parts, which are referred to herein as the level detector 601 and the slope detector 602, whose outputs are combined in an OR gate 603 to produce for each channel a speech decision which is stored in a 48-channel decision store 604, to the output of which the line 110 is connected. Each of the detectors 601 and 602 is supplied with the transmitter average T on the lines 115, and is enabled in sample frame 14 to update the decision which is effected in each superframe. In its preferred form, each of these detectors comprises a read-only memory (ROM).

The performance of the DSI transmission system is dependent to a considerable extent on the ability of the speech detector to detect speech signals in the presence of noise. The speech detector should be able to detect speech signals at low levels in order to avoid excessive clipping of speech signals at the start of speech utterances, but at the same time should not respond to relatively high levels of noise alone because this would undesirably increase the activity of the DSI transmission. In order to comply with these requirements, the speech detector 109 is designed to exploit differences in the characteristics of noise and speech signals, namely that (a) speech signals usually have a higher level than noise, and (b) whereas noise is continuous, speech signals occur in bursts with the signal level progressively increasing at the start of each burst. It is to this end that the speech detector 109 comprises the two detectors 601 and 602.

Each of the detectors 601 and 602 classifies each channel as being in one of three states, namely speech, hangover, and silence. For ease of reference, in FIGS. 7 and 8 these states are denoted by the value of an index, M for the level detector and K for the slope detector, each index having the value 0 for silence, 1 for speech, and 2 for hangover. Thus M=1 indicates that the level detector declares that the particular channel is carrying speech.

The hangover state is a temporary state which a channel is deemed to be in immediately following the speech state, and is provided to avoid speech clipping after intersyllabic pauses in speech. In each detector, a channel which previously was declared as being in the speech state, but in respect of which speech is no longer detected, is deemed to be in the hangover state and an initial hangover count is set. If speech is still not detected in successive superframes, then this hangover count is decremented until it reaches zero, when the channel is declared silent. The initial hangover count is fixed in the level detector but is variable in the slope detector, as is further explained below.

Referring again to FIG. 6, the level detector 601 consists of three parts, namely a comparator 605, a hangover and control unit 606, and a decision store 607. In sample frame 14 in each superframe, for each channel, the comparator 605 compares the transmitter average T with a fixed threshold TF which is above the highest possible noise level. The result of this comparison is supplied to the unit 606 and via the line 122 to the off-hook detector 113 in FIG. 1. The unit 606 determines the state of the channel in dependence upon this comparison and the channel's previous state as stored in the store 607, and stores the current state of the channel, and any hangover count which is applicable, in the store 607. The unit 606 supplies a logic 1 on the output line 608 if the channel is determined as being in either the speech or the hangover state.

The slope detector 602 consists of a delay unit 609, comparators 610, a hangover, control, and threshold generator unit 611, and a decision and threshold store 612. The delay unit 609 provides a delay of 1 superframe for the transmitter average T to provide a previous average TP via lines 613 to the comparators 610. In sample frame 14 in each superframe, for each channel, the comparators 610 compare the transmitter averge T with the previous average TP, a first threshold TL, and a second threshold TH and supply the comparison results to the unit 611. The thresholds TL and TH are variable thresholds which are stored for each individual channel in the store 612. The unit 611 determines the state of the channel in dependence upon the comparison results and the channel's previous state as stored in the store 612, generates new thresholds TL and TH if necessary, and stores the current state of the channel, together with any new hangover count and thresholds TL and TH, in the store 612. The unit 611 supplies a logic 1 on the output line 614 if the channel is determined as being in either the speech or the hangover state.

Thus it will be seen that the speech decision on the line 110 is present for each channel, i.e. the channel is deemed to be carrying speech, unless both the level detector and the slope detector declare the channel to be silent, i.e. both M=0 and K=0.

Figure 7:
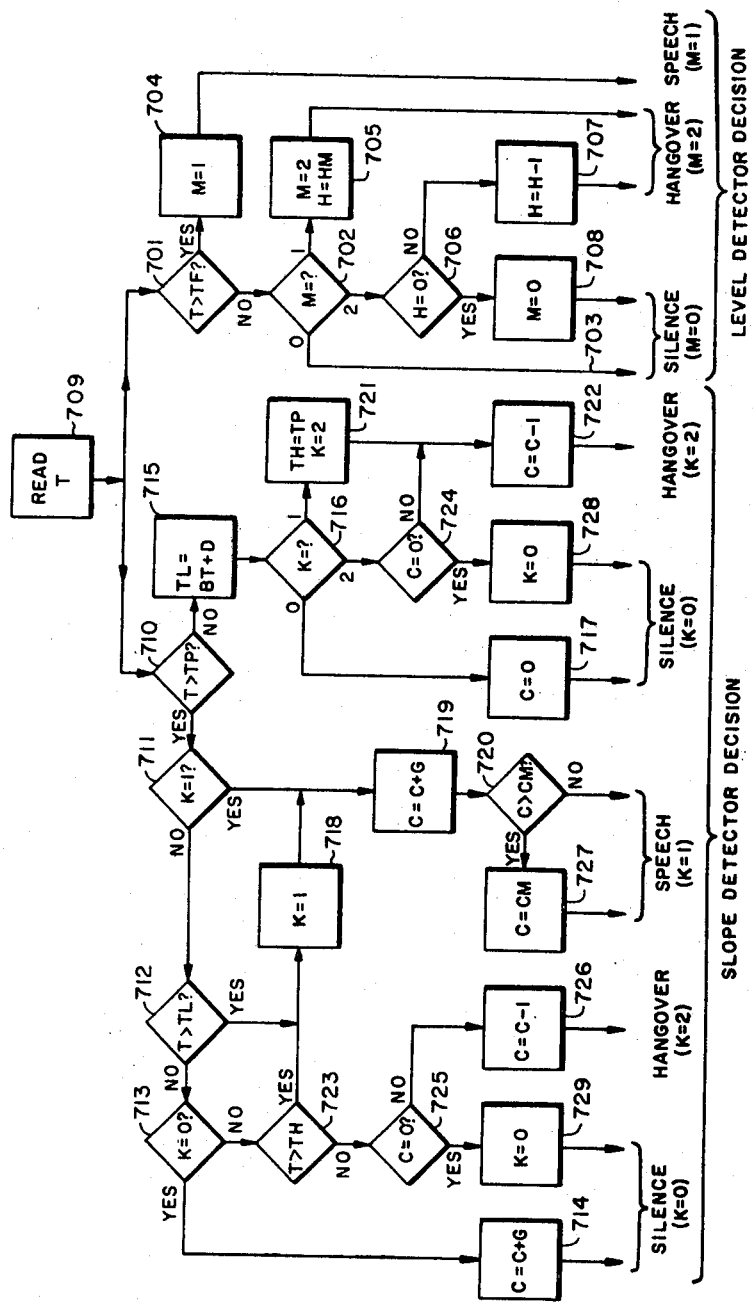
FIG. 7 shows a flow chart in explanation of the operation of the speech detector.
Figure 8:
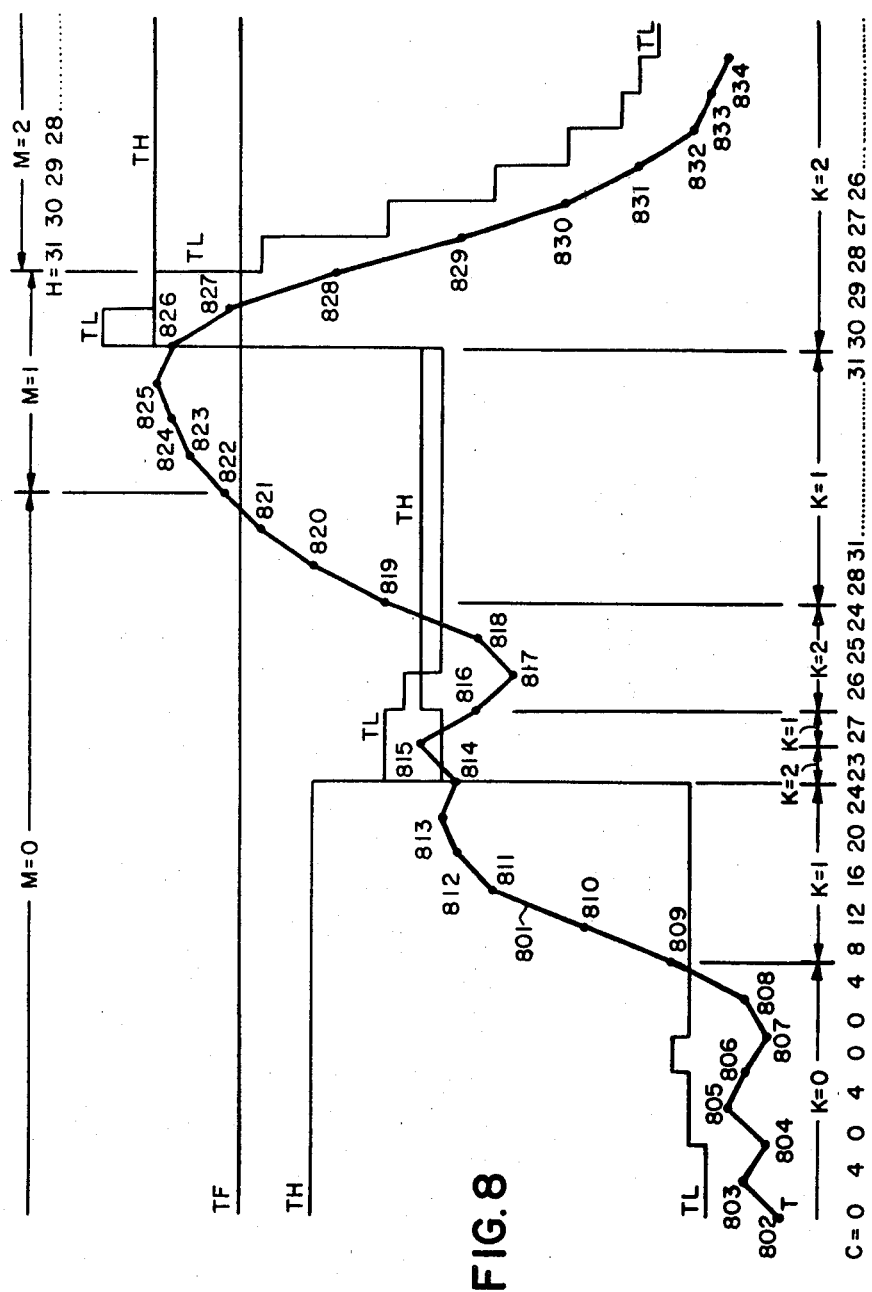
FIG. 8 is a signal level diagram illustrating the operation of the speech detector.

The operation of the speech detector will be further understood from the following description with reference to FIGS. 7 and 8. In FIG. 7 B, D, and G are integers, H is the hangover count in the level detector, HM is a maximum value of H, C is the hangover count in the slope detector, CM is a maximum value of C, and the other symbols have the meanings already described. For the illustration in FIG. 8 it has been assumed that B=1, D=5, G=4, and CM=HM=31. Each of FIGS. 7 and 8 relates to only one of the 48 channels, all the channels being treated in the same manner. FIG. 8 illustrates the transmitter average T for the channel as a line 801 on which each point represents the value of T in one superframe, and also illustrates the resultant values of M, H, TL, TH, K, and C. It is initially assumed that M=K=C=0. Successive points on the line 801 are identified by references 802 through 834.

Considering firstly the operation of the level detector, for each of the points 802 through 821 T≯TF (interrogation 701 in FIG. 7) and the previously stored value of M is zero (interrogation 702 in FIG. 7) so that in FIG. 7 the branch 703 is reached and M remains zero (silence). For each of the points 822 through 827 T>TF, so that, regardless of the previously stored value of M, M is set to 1 (speech) in block 704 in FIG. 7. For point 828 the result of the interrogation 701 is negative, so that the value of M is interrogated at block 702 in FIG. 7. The previously stored value of M is 1, so that block 705 in FIG. 7 is reached, M being set to 2 (hangover) and H being set to HM=31. For each of points 829 through 834 the result of the interrogation 701 is negative and the previously stored value of M, interrogated in block 702, is 2 so that in FIG. 7 the value of H is interrogated at block 706. For these points H≠0, so that H is decremented each time at block 707 in FIG. 7 and M is unchanged. Unless T again exceeds TF, this decrementing continues in successive superframes until H=0, when interrogation 706 has a positive result so that block 708 is reached in which M is set to zero (silence).

Considering now the operation of the slope detector, after reading the value T in each superframe (block 709 in FIG. 7), this value is compared with the previous value TP (interrogation 710 in FIG. 7). If T>TP, as at points 803, 805, and 808, then an interrogation is made as to whether K=1 (speech) in block 711 of FIG. 7. For each of the points 803, 805, and 808 the previous value of K is zero, so that the result of this interrogation is negative. In a subsequent interrogation 712 T is compared with the first threshold TL, and for each of the points 803, 805, and 808 T≯TL so that a subsequent interrogation in block 713 is effected as to whether K=0. For each of these points the result of this interrogation is positive, so that in a block 714 the previous value of C is increased by G=4, K remaining unchanged.

For each of the points 804, 806, and 807 the result of the interrogation 710 is negative, so that in a block 715 the first threshold TL is set to BT+D, i.e. T+5 in FIG. 8. The previous value of K is then interrogated in a block 716, and, because in the case of each of these points the previous value of K is zero, C is set to zero in a block 717 and K remains unchanged. Thus for all of the points 803 to 808 K=0 (silence). It can be seen that the threshold TL is adaptively adjusted during this period, so that this threshold is generally a little above the level of noise present on the particular channel.

For the point 809 the interrogation 710 has a positive result, the subsequent interrogation 711 has a negative result, and the resultant interrogation 712 has a positive result because now T>TL, so that K is set to 1 (speech) in block 718 in FIG. 7. For each of the points 810 through 813 the interrogation 710 and the resultant interrogation 711 both have positive results. Thus for each of the points 809 through 813 C is increased by G=4 in a block 719; this gradual increasing of C, and hence the hangover period which will subsequently occur, reflects the increasing reliability of the speech decision reached initially at the point 809. C is in each case compared with CM=31 in an interrogation 720; for each of these points the result of this interrogation is negative so that no further action is taken.

For the point 814 T<TP, so that the first threshold TL is again reset in block 715. In this case the previous value of K interrogated in block 716 is 1, so that in a block 721 the second threshold TH is set to the previous average value TP and K is set to 2 (hangover). Subsequently in a block 722 C is decreased by 1 to 23. For the point 815 T>TP, K≠1, T≯TL, and K≠0, so that an interrogation T>TH? (block 723 in FIG. 7) is reached whose result is positive. Accordingly, K is set to 1 in block 718 and C is increased in block 719. This recognizes the point 815 as comprising speech; this recognition is based on the fact that previously the lower-level point 813 was identified as comprising speech, so that the relatively higher-level point 815 is also assumed to comprise speech.

The point 816 results in a hangover decision (K=2) in the same manner as for the point 814, the thresholds TL and TH being reset and C being decreased by 1 to 26. For the point 817 T>TP so that the threshold TL is reset, and the interrogation 716 is reached and reveals that K=2, so that in an interrogation 724 C is assessed and, since it is not zero, is decreased by one in the block 722.

For the point 818 T>TP, K≠1, T≯TL, K≠0, and T≯TH, so that C is interrogated in a block 725 and, not being zero, is decreased by 1 in a block 726, K remaining unchanged. The point 819 and the points 820 through 825 result in the same circumstances as the points 809 and 810 through 813 respectively, except that for each of the points 820 through 825 increasing C in block 719 results in the interrogation C>CM in block 720 having a positive result, so that for each of these points C is set to CM=31 in a block 727. At the point 826 both of the thresholds TL and TH are reset in the same manner as at the points 814 and 816, and a hangover decision (K=2) is reached so that C is reduced by one. In the same manner as for the point 817, at each of the points 827 through 834 the threshold TL is reset and C is reduced by 1. Unless the line 801 again crosses the threshold TL or TH, this reduction of C continues in successive superframes until C=0, when one of the interrogations 724 and 725 has a positive result so that in one of blocks 728 and 729 respectively K is set to zero (silence).

It can be seen, therefore, that the level detector 601 provides a reliable detection of the presence of speech each time that the average T exceeds the fixed threshold TF, and that after each such detection the speech decision on the line 110 is maintained for a fixed hangover period of 32 superframes, or about 108 ms, to maintain the decision during intersyllabic pauses in speech. On the other hand, the slope detector 602 provides a less reliable but much earlier detection of the start of speech bursts, as at the point 809, to produce the speech decision on the line 110 as quickly as possible and hence to avoid excessive clipping of speech signals at the start of speech bursts. As this detection is less reliable, the hangover period of the slope detector is not immediately set to the maximum as in the level detector, but instead is increased only gradually to avoid excessively increasing the activity of the DSI transmission. For example, the avarage T at the point 809 could alternatively be due to noise transients instead of the start of speech, in which case the line 801 would not rise after this point. In this case although the slope detector would reach the incorrect decision K=1 (speech) for the point 809, this decision would be maintained only for the short hangover period of 8 superframes so that the DSI transmission activity would be only slightly increased. In any event, the value T is itself an average taken over the duration of one superframe, and the threshold TL is adaptively adjusted to be above the average noise level of the channel, so that the slope detector is relatively insensitive to noise transients.

ECHO DETECTOR

The echo detector 111, which forms the subject of copending U.S. application Ser. No. 187,785 filed concurrently herewith, is illustrated in more detail in FIGS. 9A and 9B, and serves to produce an echo decision on the line 112 when, for any particular channel, the transmitter average T is derived from an echo of the received signal for that channel rather than a speech signal to be transmitted.

The production of the echo decision is hampered by the fact that the received signals are delayed by a variable end delay of up to 25 ms before appearing as an echo in the transmitter, and the transmitter and receiver signals are not synchronous. In view of these considerations, the echo detector compares, for each channel once in each superframe, the transmitter average T with the maximum or peak receiver average RA which has occurred in the present and preceding 8 receiver superframes. The 8 superframes have a duration of about 27 ms, which is sufficient to accommodate the maximum end delay of 25 ms. The echo detector in fact determines the peak receiver average, effects this comparison, and updates the echo decision, for each channel during sample frames 15 and 16 in each superframe.

Figure 9A:
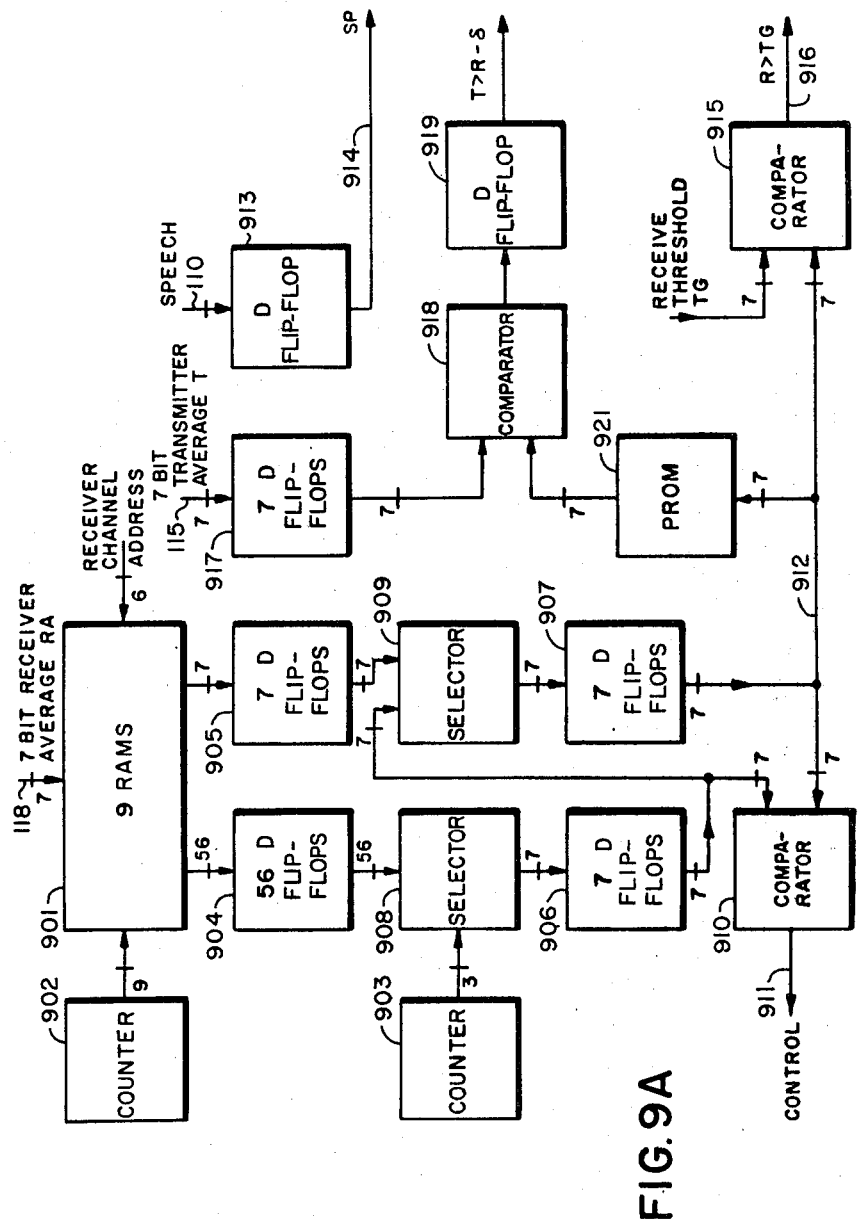
FIGS. 9A and 9B illustrate an echo detector of the transmitter.

Referring to FIG. 9A, for determining the peak receiver average for each channel the echo detector comprises 9 48-channel×7-bit RAMs 901, counters 902 and 903, buffer stores formed by D flip-flop 904, 905, 906, and 907, selectors 908 and 909, a comparator 910, and a control unit which is not shown. This part of the echo detector operates as follows.

Under the control of the receiver channel address, which has the same characteristics as the transmitter channel address but controls operations within the receiver, the 7-bit receiver average RA on the lines 118 for each channel is written into one of the RAMs 901, the particular RAM being varied cyclically under the control of the counter 902. In consequence, at any instant the RAMs 901 store the present and the previous 8 receiver averages RA for each of the 48 channels. For each channel in turn, the current receiver average is transferred to the D flip-flops 905, and the previous 8 receiver averages are transferred to the D flip-flops 904, to synchronize them to the transmitter timing. Under the control of the counter 903, the selector 908 selects one of the previous 8 receiver averages and applies this to the D flip-flops 906. Under the control of the control unit (not shown), the selector 909 selects the current receiver average and transfers this to the D flip-flops 907. The comparator 910 compares the averages stored in the flip-flops 906 and 907 and emits a comparison signal via a line 911 to the control unit. If this signal indicates that the average stored in the flip-flops 906 is greater than that stored in the flip-flops 907, the control unit causes the selector 909 to transfer the average contained in the flip-flops 906 to the flip-flops 907; otherwise the selector 909 is unchanged. The control unit then increments the counter 903 to transfer another previous average into the flip-flops 906. The comparison and subsequent steps are repeated in turn for all of the previous receiver averages, after which it can be seen that the peak receiver average R for the current and previous 8 superframes is contained in the flip-flops 907 and hence is present on lines 912.

The echo decision for each channel is based on three criteria. A first of these is that speech must be present on the transmit path. To this end the speech decision is supplied to the echo detector via the line 110 and is buffered in a D flip-flop 913 whose output is a signal SP on a line 914. A second of the three criteria is that speech must be present on the receive path. To determine this the peak receiver average R on the lines 912 is compared with a fixed receive threshold TG in a comparator 915 whose output is a signal R>TG on a line 916. The third criterion serves to distinguish between an echo situation and a double-talk situation, and is based on the fact that in passing from the receive path to the transmit path an echo signal must suffer an attenuation of at least δ. δ is the worst case echo return loss, and is for example 5 to 6 dB. To produce this third criterion, the transmitter average T on the lines 115 is buffered in D flip-flops 917 and then compared with R−δ in a comparator 918, whose output is buffered in a D flip-flop 919 to produce a signal T>R−δ on a line 920. Because T and R are averages based on a non-linear companding code, whereas δ is a fixed attenuation, the difference R−δ is produced using a PROM (programmable read-only memory) 921 which is addressed by the peak receiver average R on the lines 912 to produce the difference R−δ at its output.

Figure 9B:
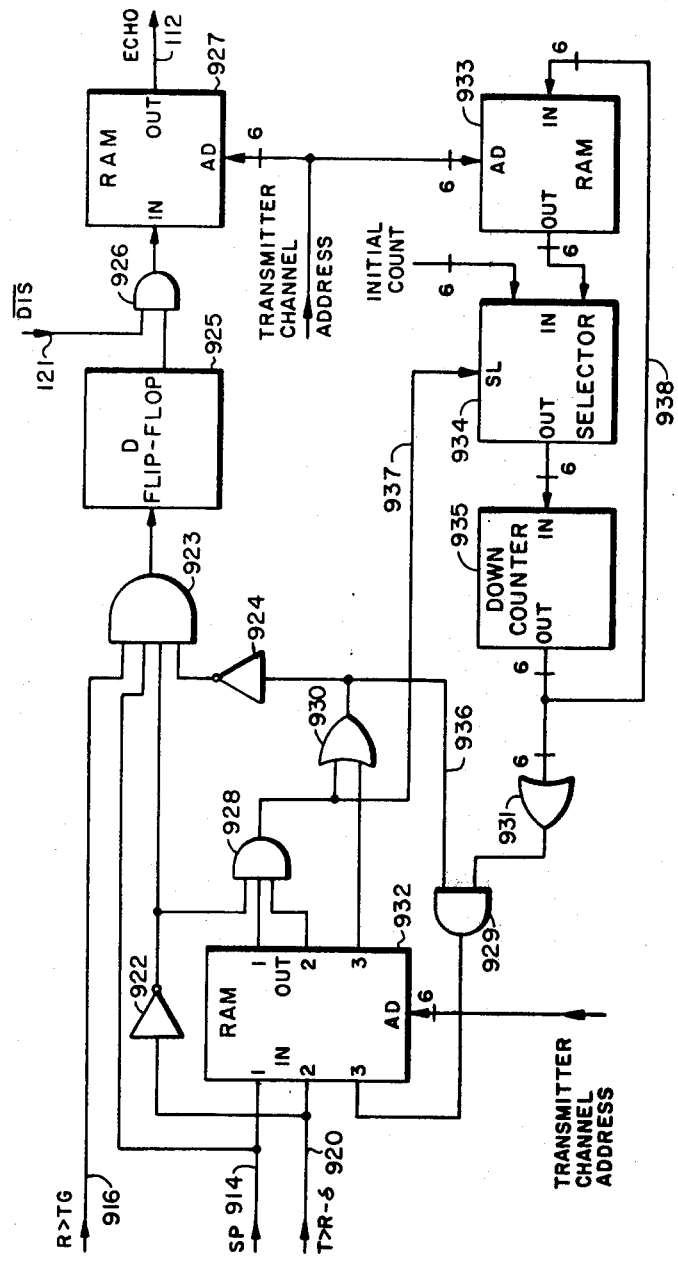

Referring now to FIG. 9B, the signals SP and R>TG on the lines 914 and 916 respectively, and the signal T>R−δ produced by inversion in an inverter 922 of the singal on the line 920, are applied to three of the inputs of a four-input AND gate 923. The gate 923 normally receives an enabling logic 1 at its fourth input from an inverter 924. The output of the gate 923 is buffered in a D flip-flop 925 before being gated with the disabling signal $\overline{DIS}$ on the line 121, as described further below with reference to FIG. 10, in an AND gate 926. The output of the gate 926 constitutes the echo decision for the particular channel, is stored in a RAM 927 at the relevant transmitter channel address, and is produced at the output of the RAM 927 on the line 112.

The remainder of the circuitry shown in FIG. 9B constitutes a hangover circuit which serves to inhibit production of the echo decision on the line 112 for a predetermined period, for example 31 superframes or about 104 ms, after a double talk situation terminates. The hangover circuit consists of the inverter 924, a three-input AND gate 928, a two-input AND gate 929, a two-input OR gate 930, a six-input OR gate 931, a 48-channel×3-bit RAM 932, a 48-channel×6-bit RAM 933, a six-bit selector 934, and a six-bit down counter 935.

For each channel, the RAM 932 is arranged to store the signals SP and T>R−δ on the lines 914 and 920 respectively, and the normally 0 output of the gate 929, for one supreframe. The inputs of the AND gate 928 are supplied with the signal $\overline{T>R-\delta}$ from the inverter 922, and the signals SP and T>R−δ in respect of the previous superframe from the RAM 932. Consequently the ouput of the gate 928 is 0 except immediately at the end of a double talk situation when it becomes 1. Thus at the end of a double talk situation on any channel, the gate 928 produces a logic 1 at its output. This is conducted via the OR gate 930 to the inverter 924 to inhibit the AND gate 923 so that the echo decision is not produced for the channel, and via a line 936 to one input of the gate 929 which is consequently enabled. The output of the gate 928 is also applied via a line 937 to a select input SL of the selector 934 to cause a 6-bit initial hangover count of, for example, 31 to be entered into the counter 935. This count is reduced by one in the down counter and the reduced count is stored for the particular channel in the RAM 933 via lines 938. The outputs of the counter 935 are connected to the inputs of the OR gate 931, which consequently produces a logic 1 output which is stored in the RAM 932 via the enabled AND gate 929.

In each subsequent superframe the gate 923 continues to be inhibited, and the gate 929 continues to be enabled, by the logic 1 stored for the channel in the RAM 932 and applied to the other input of the OR gate 930. The output of the gate 938 is now 0, so that via the line 937 the selector 934 is caused in each superframe to select the previously stored count from the RAM 933 and to enter this into the counter 935, where it is reduced by one, the reduced count being re-stored in the RAM 933. When the count reaches zero, the outputs of the gates 931 and 929 become 0 so that a 0 is now stored in the RAM 932. In the next superframe, therefore, the OR gate 930 produces a 0 output to inhibit the gate 929 and enable the gate 923 so that, if the echo criteria described above are satisfied, the echo decision is produced.

ECHO DETECTOR DISABLE CIRCUIT

Figure 10:
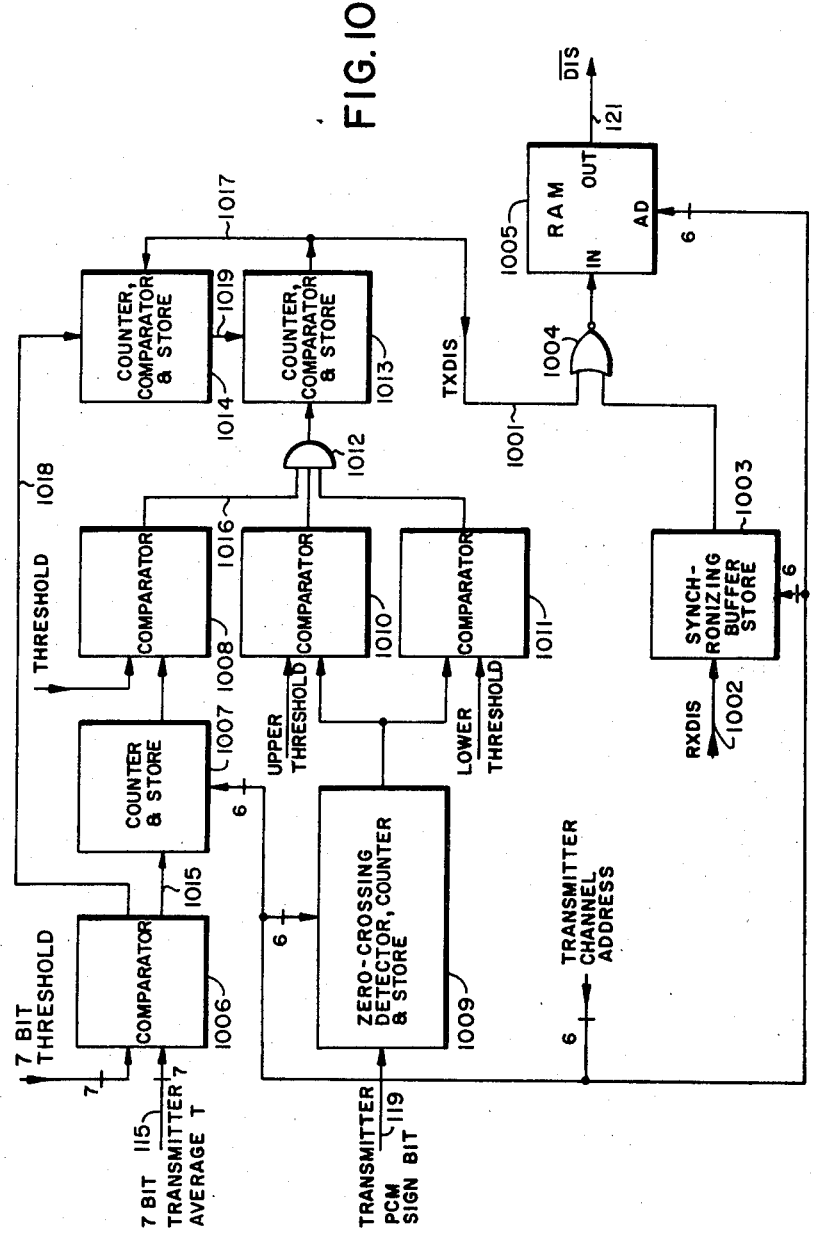
FIG. 10 illustrates an echo detector disable circuit of the transmitter.

In order to disable echo suppressers for the transmission of data via a connection line, data sets transmit via the connection line an initial tone of 2100 Hz nominal frequency with a duration of 300 to 400 ms. The echo detector or disable circuit 117 serves to detect this tone and upon such detection to produce the signal DIS on the line 121 to prevent production of an echo decision, and hence to avoid echo suppression, for the relevant channel. The circuit 117, part of which is illustrated in FIG. 10, includes a detector associated with the transmit path for producing a signal TXDIS on a line 1001 when the tone is detected on the transmit path, and a similar detector, which is not shown, associated with the receive path for producing a signal RXDIS on a line 1002 when the tone is detected on the receive path. The signal RXDIS is synchronized with the transmitter timing in a synchronizing buffer store 1003. The output of this store 1003 and the line 1001 are connected to inputs of a NOR gate 1004, the output of which constitutes the signal $\overline{DIS}$ which is stored for each channel in a RAM 1005 the output of which is connected to the line 121. Thus if either of the signals TXDIS and RXDIS is a logic 1, i.e. if a disabling tone is detected in either transmission direction, then for that channel the signal $\overline{DIS}=0$ is produced to inhibit the gate 926 in the echo detector and thereby prevent the production of an echo decision for that channel.

The detector for producing the signal TXDIS comprises a comparator 1006, a counter and store 1007, a comparator 1008, a zero-crossing detector, counter, and store 1009, comparators 1010 and 1011, an AND gate 1012, a counter, comparator, and store unit 1013, and a further counter, comparator, and store unit 1014. In order for the detector to change the signal TXDIS from 0 to 1, it is required that in each of 6 consecutive groups each of 10 consecutive superframes, the level of the transmitter average T for the particular channel be greater than a threshold for 9 of the 10 superframes and the received signal frequency be within a frequency window of 2000 to 2250 Hz. In order for the detector to change the signal TXDIS from 1 to 0, it is required that in each of 3 consecutive groups each of 10 consecutive superframes the level of the transmitter average T for the particular channel be less than the threshold for 9 of the 10 superframes.

For each channel, the comparator 1006 compares the transmitter average T on the lines 115 with a 7-bit threshold which is set to correspond to a signal level of −29dBm0. If the average T is greater than the threshold, the comparator 1006 supplies a signal via a line 1015 to the unit 1007, in which the number of such signals (at most one per superframe) is counted and stored. After 10 superframes the unit 1007 supplies the accumulated count to the comparator 1008, which compares the count with a threshold corresponding to a count of 9; the count in the unit 1007 is then reset. If the comparator 1008 determines that the accumulated count is at least 9, then it supplies an enabling signal to the AND gate 1012 via a line 1016.

The unit 1009 is supplied with the transmitter PCM sign bit on the line 119, and detects and counts changes of this bit for each channel over a period of 10 superframes. The accumulated count is supplied from the unit 1009 to the comparators 1010 and 1011, where it is compared with upper and lower thresholds corresponding to the upper and lower frequency limits of 2250 and 2000 Hz. If the accumulated count is within these limits both comparators 1010 and 1011 supply a logic 1 to the AND gate 1012, which if enabled via the line 1016 supplies a logic 1 to the unit 1013.

For each channel, the unit 1013 counts successive logic 1s, which may be supplied from the gate 1012 once for every group of 10 superframes, compares the accumulated count with 6, and stores the accumulated count. If the comparison reveals that in 6 consecutive groups of 10 superframes a logic 1 has been received from the gate 1012, then the signal TXDIS is changed from 0 to 1. This signal also serves to enable the unit 1014 via a line 1017.

The unit 1014, when enabled via the line 1017, operates in the same manner as the units 1007 and 1008 except that it is responsive to signals supplied via a line 1018 from the comparator 1006 each time that the average T is less than the threshold, and produces a signal on a line 1019 if for the relevant channel such signals occur at least 9 times in 10 superframes. The unit 1013 counts successive signals on the line 1019 and stores the accumulated count; when this count reaches 3 the unit 1013 changes the signal TXDIS from 1 to 0.

OFF-HOOK DETECTOR

Figure 11:
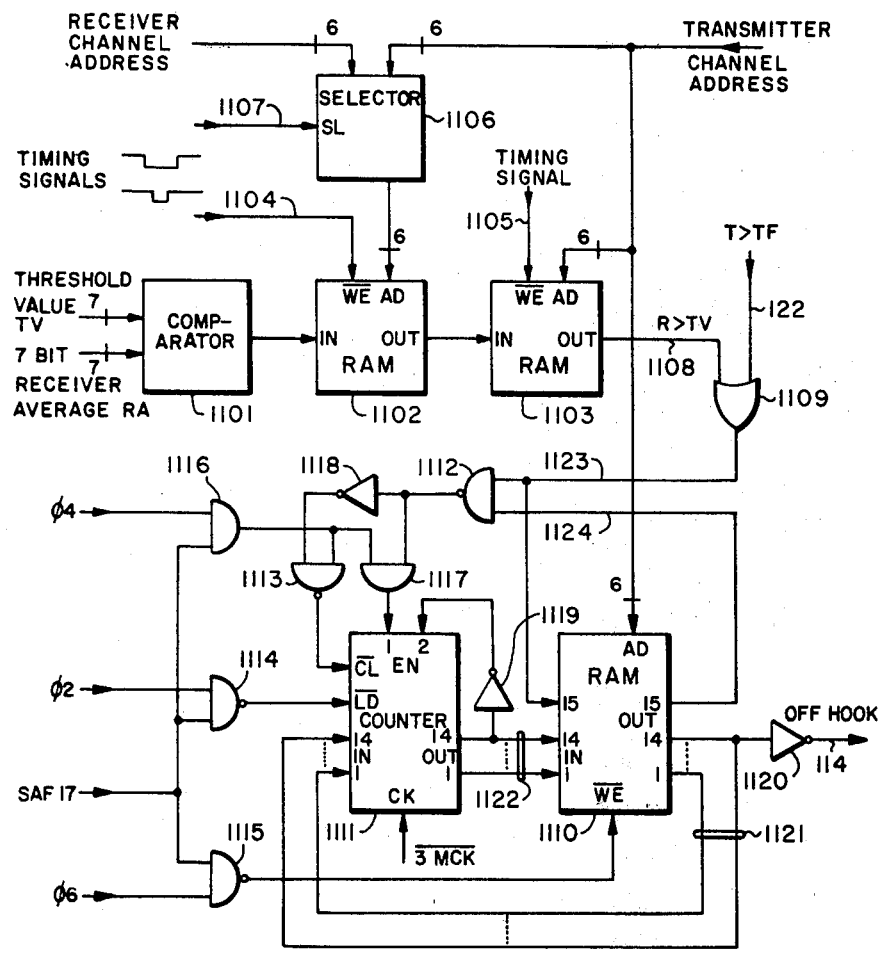
FIG. 11 illustrates an off-hook detector of the transmitter.

The off-hook detector 109, which is illustrated in detail in FIG. 11, serves to distinguish between idle (on-hook) and busy (off-hook) channels solely from the information of each channel, i.e. without knowledge of the signalling status for each channel. This is important because the use of common channel signalling could prevent the DSI transmission system from receiving signalling information.

On an idle channel only noise is present, whereas on a busy channel speech is present in one of the two transmission directions on average about 75% of the time, with pauses of generally no more than a few seconds. The off-hook detector 109 uses this distinction to deem a channel on-hook unless, within a period of $2^{13}=8192$ superframes or about 28 seconds, the receiver average RA or the transmitter average T exceeds a respective threshold in at least two consecutive superframes. The requirement for the threshold to be exceeded in at least two consecutive superframes reduces the risk that an on-hook channel will be deemed to be off-hook in response to noise transients.

Accordingly, referring to FIG. 11, the off-hook detector includes a comparator 1101 which for each channel compares the receiver average RA with a threshold value TV. The comparison result is synchronized to the transmitter timing by being written into and read from RAMs 1102 and 1103 under the control of timing signals supplied to the write enable inputs $\overline{WE}$ of these RAMs via lines 1104 and 1105. The RAM 1103 is addressed for each channel by the transmitter channel address; the RAM 1102 is selectively supplied with either the transmitter channel address or the receiver channel address via a selector 1106 to the select input SL of which a further timing signal is supplied via a line 1107. Consequently, for each channel a signal R>TV is supplied from the output of the RAM 1103 via a line 1108 to one input of an OR gate 1109, to a second input of which the signal T>TF produced in the speech detector 109 is applied via the line 122. The output of the OR gate 1109 is a logic 1 if for the particular channel either RA>TV or T>TF.

The remainder of the off-hook detector comprises a 48-channel×15-bit 1110, a 14-bit counter 1111 having a clear input $\overline{CL}$, a load input $\overline{LD}$, a clock input CK to which the clock $\overline{3MCK}$ is supplied, and count enable inputs EN1 and 2, 2-input NAND gates 1112 to 1115, 2-input AND gates 1116 and 1117, and inverters 1118 to 1120. The off-hook detector updates its decision for each channel in sample frame 17 of each superframe. In this sample frame, for each channel, with the signal $\phi 2=1$ the output of the gate 1114 is zero to cause the counter 1111 to be loaded with a previous 14-bit count stored in the RAM 1110 and present on lines 1121, with the signal $\phi 4=1$ the gates 1113 and 1117 are enabled by the output of the gate 1116, and with the signal $\phi 6=1$ the output of the gate 1115 is zero to cause the current 14-bit count of the counter present on lines 1122, and the logic level at the output of the OR gate 1109 and present on a line 1123, to be written into the RAM 1110 at the respective channel address. The logic level on the line 1123 is present at the output of the RAM 1110 and on a line 1124 when the signals SAF17=1 and $\phi 4=1$ during the next superframe.

For each channel, if the signal on the line 1123 is 1 in two successive superframes, then in the second of these superframes the gate 1112 receives a logic 1 from each of the lines 1123 and 1124 to produce a 0 output which inhibits counting by the counter 1111 via the gate 1117 and the counter input EN1 and clears the counter via the inverter 1118, gate 1113, and counter input $\overline{CL}$. Consequently a count of zero is stored in the RAM 1110 with the signal $\phi 6 = 1$. The most significant, or 14th, bit position of the store count is inverted by the inverter 1120 to produce the signal OFF HOOK = 1 on the line 114; i.e. the channel is deemed to be busy or off-hook.

If the signal on the line 1123 is not 1 in the two successive superframes, then the gate 1112 produces a 1 output which does not clear the counter 1111 but enables the counter via the gate 1117 and input EN1 with the signal $\phi 4 = 1$. If the count loaded into the counter with the signal $\phi 2 = 1$ is less than 8192, i.e. if the M.S.B. of the count is 0, then the counter is also enabled via the inverter 1119 and its input EN2. In this case the counter is enabled to count one pulse of the clock $\overline{3MCK}$, and the incremented count is stored in the RAM 1110. If this situation continues for a holdover time of about 28 seconds, i.e. if for one channel for 8192 superframes following clearing of the counter the signal on the line 1123 is not 1 in two successive superframes, the count of the counter is incremented to 8192 so that its M.S.B. is 1. Accordingly, the signal on the line 114 becomes 0 for the channel, indicating that the channel is idle or on-hook. The M.S.B., each time that it is loaded into the counter 1111, now inhibits incrementing of the count via the inverter 1119 and input EN2, so that the channel continues to be deemed on-hook until the counter 1111 is again cleared for the particular channel.

ASSIGNMENT CONTROL UNIT

The assignment control unit 104 determines, in sample frames 18 to 22 of each superframe, which channels will be transmitted and how they will be transmitted in the following superframe. The unit 104 also generates an assignment control word ACW for transmission in the first frame of each superframe on the DSI transmission link, and also controls the transmission of channels which are transmitted partially rather than continuously. Parts of the assignment control unit are illustrated in FIGS. 12A to 12D.

Before the assignment control unit is described further, the DSI transmission link format is explained in detail. As previously described, each superframe on the DSI link consists of 28 frames each of 186 bits. The first bit in each frame is alternately 1 and 0, being 1 in odd-numbered frames, to provide a frame reference pattern; the second bit in each frame is 0 in all odd-numbered frames and is 1 in frame 2, 0 in frame 4, and 1 in frame 6 to provide a superframe reference pattern. The second bit in frames 8, 10, 12, and 14 provides a 4-bit reference pattern for the signalling frame of digroup 1, in frames 16, 18, and 20 constitutes a remote alarm indicator, and in frames 22, 24, 26, and 28 provides a 4-bit reference pattern for the signalling frames of digroup 2. In each of frames 2 to 28 the 3rd through 10th bits are signalling bits and the remainder of the frame comprises 176 data bits. In frame 1 bits 3 and 4 are stuff indication bits, one for each digroup; bits 5 and 6 are word length bits W1 and W2 described below, bits 7 through 86 are constituted by the assignment control word of 80 bits, the following 7 bits constitute a single error correcting Hamming code for protection of bits 3 through 86, the following bit is a 0 for zero code suppression (the transmission via the DSI link being in inverted form), and the remaining 92 bits comprise 29 3-bit NIC header codes and 5 zeros for zero code suppression. Referring back to FIG. 3, it can be seen that in frame 1 the signal ACWEN is 1 during bits 7 through 86 to enable transmission of the assignment control word ACW, and the signal NICEN is 1 during the last 92 bits of the frame to enable transmission of the NIC header codes and associated zero code suppression bits. When the signal NICEN becomes 1 the signal LNIC, which has been a logic 1, becomes alternately 0 for two periods of the clock 1.5MCK and 1 for one period of the clock 1.5MCK for effecting the transmission of individual NIC header codes as described below, except that every fifth 0 of the signal LNIC lasts for an extra clock period, as indicated in FIG. 3 by asterisks, to provide the zero code suppression bits.

The 176 data bits in each of frames 2 to 28 of the DSI superframe can be constituted by 29 6-bit words (with 2 bits unused), 25 7-bit words (with 1 bit unused), or 22 8-bit words, the number of bits in each word of a superframe being determined as described below by the assignment control unit. It follows that a maximum of 29 channels can be transmitted continuously via the DSI transmission link; this number is both the maximum number of words which can be accommodated in each of frames 2 to 28 and the maximum number of NIC header codes, one for each channel, which can be accommodated in frame 1.

As already described, the assignment control word comprises 80 bits which indicate sequentially the transmission status, in the relevant superframe, of each of the 48 channels. A channel which is not transmitted in the superframe is assigned a 2-bit code 00 in the assignment control word ACW. A channel which is transmitted partially in the superframe is assigned a 2-bit code 01 in the word ACW. The first to eighth and tenth to 17th channels which are transmitted continuously are each assigned a single-bit code 1 in the word ACW, and the 9th channel and any other channels (18th to 29th) which are transmitted continuously are each assigned a 2-bit code 10 in the word ACW. This latter requirement avoids more than 9 consecutive zeros being present in the transmitted word ACW on the DSI link. As the word ACW is required always to consist of exactly 80 bits, the restriction is imposed that in each superframe at least 17 channels are transmitted continuously. For example if in a superframe channel numbers 0, 1, 3 and 6 are to be transmitted continuously, channel number 2 is not being transmitted, and channel numbers 4 and 5 are to be transmitted partially, then their transmission status in the superframe would be represented by the first 10 bits of the assignment control word ACW being 1100101011.

Figure 12A:
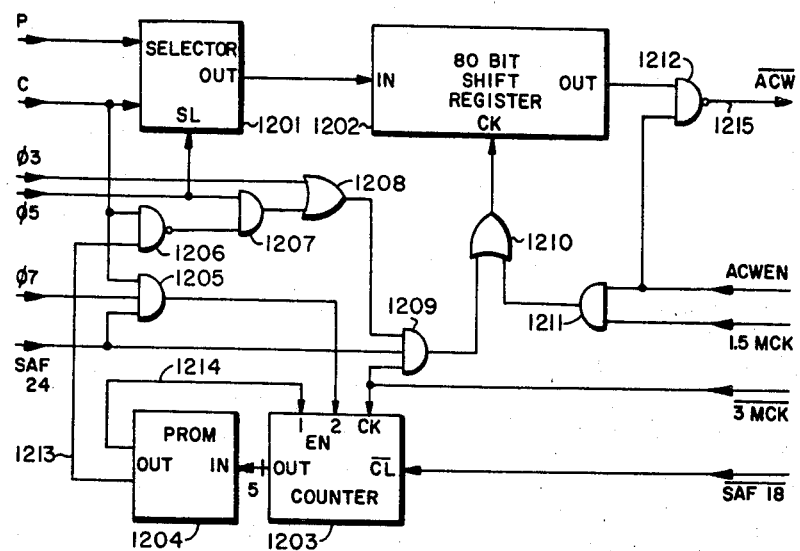
FIGS. 12A to 12D illustrate an assignment control unit of the transmitter.

FIG. 12A illustrates a part of the assignment control unit, which serves to produce the assignment control word in dependence upon signals P and C which are produced elsewhere in the assignment control unit as described below. For each channel, the signals P=0, C=0 indicate that the channel is not being transmitted, P=1, C=0 indicate that the channel is to be transmitted partially, and P=0, C=1 indicate that the channel is to be transmitted continuously, in the superframe. This part of the unit 104 comprises a selector 1201, an 80-bit shift register 1202, a counter 1203, a PROM 1204, and gates 1205 through 1212.

In sample frame 24, for each channel, with the signal $\phi 3 = 1$ the output of the OR gate 1208 is 1 and the signal SAF24 = 1 so that the AND gate 1209 is enabled to supply one pulse of the clock $\overline{3MCK}$ via the OR gate 1210 to the clock input CK of the shift register 1202. At this time the signal $\phi 5=0$ is applied to the select input SL of the selector 1201, with the result that the signal C for the relevant channel is entered into the shift register 1202. Subsequently, with the signal $\phi 5=1$, the AND gate 1207 is enabled. If for the channel the signal $C=0$, then the output of the gate 1206, and hence the gates 1207 and 1208, is 1 to enable a further pulse of the clock $\overline{3MCK}$ to be applied via the gates 1209 and 1210 to the shift register 1202 to enter the signal P, now selected by the selector 1201, into the shift register. If for the channel the signal $C=1$, then the signal $P=0$ is similarly entered into the shift register 1202 only if the PROM 1204 supplies a 0 signal on an output line 1213. The PROM 1204 is responsive to the count of the counter 1203 to produce a 0 signal on the line 1213 only for counts of 8 and 17, and to produce a 0 signal on a further output line 1214 only for the count of 17. For each channel for which the signal $C=1$, with the signal $\phi 7=1$ the counter 1203 is enabled via an input EN2, and if its count is not 17 is enabled by the line 1214 connected to an input EN1, to count one pulse of the clock 3MCK applied to its clock input CK. Thus the counter 1203 counts the number of channels which have been coded in the word ACW as being continuous. The counter is cleared in each sample frame 18 by the signal SAF18 applied to its clear input $\overline{CL}$.

Thus at the end of sample frame 24 the 80-bit assignment control word ACW is present in the shift register 1202. With the signal $ACWEN=1$ this 80-bit word is shifted out of the register 1202, under the control of the clock 1.5MCK applied to the shift register via the gates 1211 and 1210, and via the gate 1212 to an output line 1215, which constitutes one of the lines 108 in FIG. 1, for transmission.

Figure 12B:
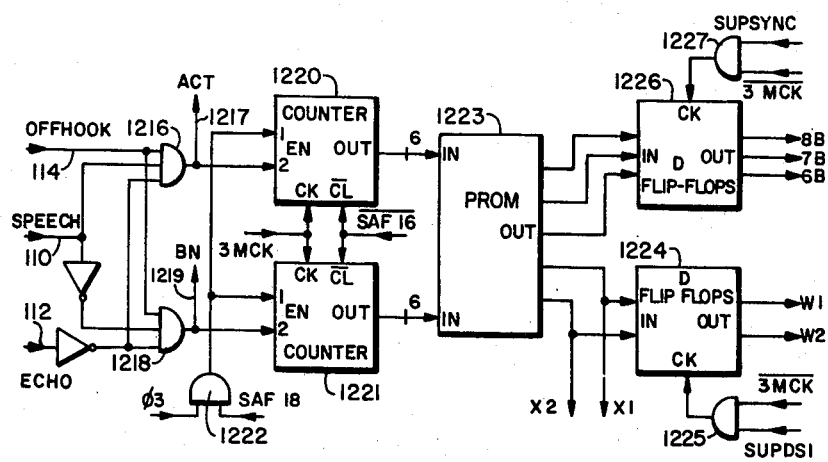

FIG. 12B illustrates the part of the assignment control unit 104 which determines for each superframe the number of bits, 8, 7, or 6, which are to be used for the transmission of each information word of each transmitted channel.

It will be recalled that non-idle (off-hook), non-echo channels are classified as being active or background noise (b.n.) channels depending on the speech decision reached by the speech detector. To this end, in dependence upon the signals OFF HOOK, SPEECH, and ECHO present on the lines 114, 110, and 112, an AND gate 1216 produces a signal $ACT=1$ on a line 1217 for each active channel and an AND gate 1218 produces a signal $BN=1$ on a line 1219 for each b.n. channel. During sample frame 16 two 6-bit counters 1220 and 1221 are cleared by the signal SAF16 applied to their clear inputs CL, and during sample frame 18 with the signals $SAF18=1$ and $\phi 3=1$ the counters 1220 and 1221 are enabled by the output of an AND gate 1222 connected to enable inputs EN1, and are selectively enabled by the outputs of the gates 1216 and 1218 connected to enable inputs EN2, to count pulses of the clock 3MCK applied to their clock inputs CK. Thus during sample frame 18 the counter 1220 counts the number Na of active channels and the counter 1221 counts the number Nb of b.n. channels.

The counts Na and Nb of the counters 1220 and 1221 are applied to the inputs of a PROM 1223, which produces at its outputs signals X1 and X2 which represent the determined number of bits per word to be used in the next superframe. The signals X1 and X2 are clocked through D flip-flops 1224, under the control of the signal SUPDSI and the clock $\overline{3MCK}$ applied to an AND gate 1225, to produce the corresponding signals W1 and W2 which constitute the word length bits which are incorporated in the next DSI superframe as bits 5 and 6 of frame 1 as already described. The PROM 1223 also produces at its outputs differently coded but corresponding output signals which are clocked through D flip-flops 1226, under the control of the signal SUPSYNC and the clock $\overline{3MCK}$ applied to an AND gate 1227, to produce word-length signals 8B, 7B, and 6B which are supplied to the encoder and buffer 103. These various word length signals represent the determined number of bits per word according to the following table:

| No. of bits per word | X1 W1 | X2 W2 | 8B | 7B | 6B |
| --- | --- | --- | --- | --- | --- |
| 8 | 0 | 0 | 1 | 0 | 0 |
| 7 | 1 | 0 | 0 | 1 | 0 |
| 6 | 0 | 1 | 0 | 0 | 1 |

The PROM 1223 is programmed to determine the number Nc of channels which are to be transmitted continuously and the number Np of channels which are to be transmitted partially in dependence upon the counts Na and Nb, and to determine the number of bits per word from the numbers Nc and Np, as follows:

If $Na \geq 29$, then $Nc=29$, $Np=$ (overload situation).

If $17 \leq Na < 29$, then $Nc=Na$, $Np=Nb$ (normal situation).

If $Na < 17$ and $Na+Nb \geq 17$, then $Nc=17$, $Np=Na+Nb-17$ (underload situation).

If $Na+Nb < 17$, then $Nc=17$, $Np=0$ (severe underload situation).

Thus it can be seen that, in the overload situation, background noise channels are not transmitted and only 29 channels are continuously transmitted (i.e. when $Na=Nc=29$, there is a concentrated freeze-out of all channels which become newly active). In the underload situation, background noise channels are transmitted continuously to comply with the requirement that at least 17 channels are transmitted continuously. In the severe underload situation no channels are transmitted partially and the minimum number of 17 channels transmitted continuously is made up of, in order of priority, active channels, background noise channels, idle (on-hook) channels, and echo channels; if any echo channels have to be transmitted, their information is suppressed by being replaced by logic 0s.

If $Nc=Np \leq 22$, then 8 bits per word are used.

If $Nc+Np > 22$ and $Nc+\frac{1}{2}Np \leq 25$, then 7 bits per words are used.

If $Nc+\frac{1}{2}Np > 25$, then 6 bits per word are used.

Thus the number of bits per word is determined. Whilst the numbers Nc and Np are referred to above for convenience, these of course need not actually be produced in the PROM 1223.

Figure 12C:
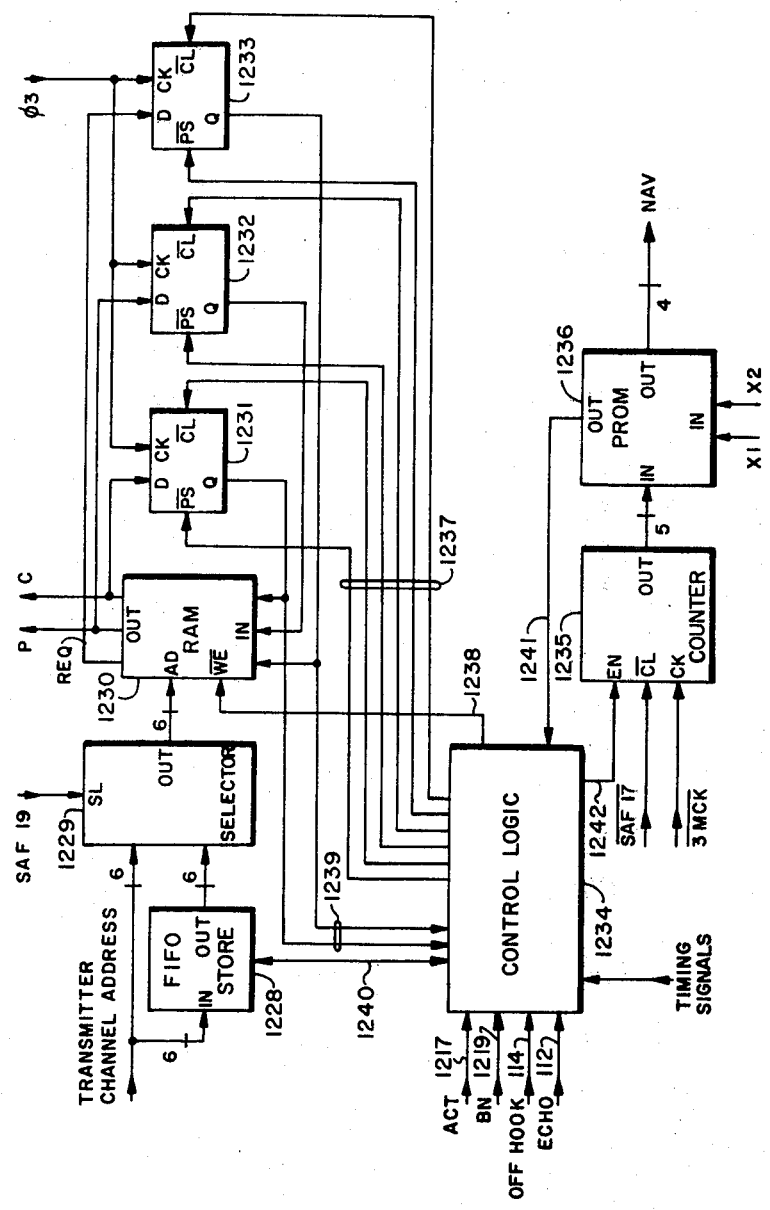

FIG. 12C illustrates parts of the assignment control unit 104 which serve to store and update the transmission status of the channels and to determine the number NAV of words in each of frames 2 to 28 on the DSI link which are available for the partial transmission of b.n. channels. The parts of the unit 104 shown in FIG. 12C comprise a first-in first-out queuing store 1228; an address selector 1229; a 48-channel by 3-bit RAM 1230; three D flip-flops 1231, 1232, and 1233 each having a data input D connected to a respective one of the three outputs of the RAM 1230, an output Q connected to the respective one of the three inputs of the RAM 1230, a clock input CK to which the signal $\phi3$ is supplied, a presetting input $\overline{PS}$, and a clear input $\overline{CL}$; a control logic unit 1234; a 5-bit counter 1235, and a PROM 1236.

The RAM 1230 stores for each channel the signals P and C already referred to, indicating the partial or continuous transmission status of each channel, and an additional signal REQ. The updating operation of this part of the assignment control unit takes place in sample frames 18 to 23 of each superframe. In each of these sample frames except sample frame 19 during which the operation is as described below, the selector 1229 supplies each channel address in turn to the address input AD of the RAM 1230, and with the signal $\phi3=1$ the prevailing signals C, P, and REQ for the channel are entered into the flip-flops 1231, 1232, and 1233 respectively. After possible modification of these signals by outputs of the control logic unit 1234 via lines 1237 connected to the presetting and clear inputs of the flip-flops, the signals C, P, and REQ for the channel are written back into the RAM by the control logic unit 1234 producing a logic 0 on a line 1238, connected to a write enable input $\overline{WE}$ of the RAM, with the signal $\phi7=1$.

The counter 1235 provides a count of the number of channels which have been assigned continuous transmission, i.e. for which C=1. This counter is cleared in sample frame 17 by the signal $\overline{SAF17}$ applied to its input $\overline{CL}$.

In sample frame 18, for each channel, with the signal $\phi4=1$, if the channel is active (the signal ACT=1 on line 1217) and the signals C=0 and REQ=0 are supplied from the flip-flops 1231 and 1233 respectively to the logic control unit 1234 via lines 1239, then via lines 1240 the logic control unit causes the channel address to be entered in the FIFO store 1228. Thus the addresses of newly active channels are entered in the store 1228. With the signal $\phi6=1$, via the lines 1237 for each channel the logic control unit 1234 sets the signal P=0 in the flip-flop 1232, sets the signal REQ=1 if the channel is active or REQ=0 if the channel is not active, in the flip-flop 1233, and sets the signal C=0 in the flip-flop 1231 if the channel is not active or if the count of the counter 1235 is not <29. Signals indicating whether the count of the counter 1235 is $\leq 17$ and <29 are supplied from the PROM 1236, which is supplied with the count of the counter, to the control logic unit via lines 1241. With the signal $\phi7=1$, in addition to the new signals C, P, and REQ being written into the RAM 1229, for each channel for which C=1 the control logic unit 1234 enables the counter 1235, via a line 1242 connected to an enable input EN of the counter, to count one pulse of the clock $\overline{3MCK}$ applied to its clock input CK.

In sample frame 19 the selector 1229 is switched by the signal $\overline{SAF19}$ supplied to its select input SL to supply channel addresses read out of the store 1228 to the address input of the RAM 1230. Channel addresses stored in the store 1228 are read out therefrom in turn, until the store 1228' is empty, under the control of the unit 1234, via the lines 1240, each channel address being read out with the signal $\phi7=1$ only if the count of the counter 1235 is <29. With the following signal $\phi3=1$ the signals C, P, and REQ for the channel are entered into the flip-flops, with the signal $\phi6=1$ the signal C=1 is set in the flip-flop 1231, and with the signal $\phi7=1$ the new signals C, P, and REQ are stored in the RAM 1230, the counter 1235 is incremented, and if the count is still <29 the next channel address is read out from the store 1228. This continues until there are no more channel addresses stored in the store 1228 or the count of the counter 1235 reaches 29.

In sample frame 20, for each channel, if the channel is active, C=0, and the count of the counter 1235 is <29, then with the signal $\phi6=1$ the signal C=1 is set in the flip-flop 1231 and with the signal $\phi7=1$ the counter 1235 is incremented.

The above sequences ensure that all of up to 29 active channels, or the 29 longest active channels if more than 29 are active, are assigned continuous transmission (C=1, P=0).

In sample frame 21, for each b.n. channel (the signal BN=1 on the line 1219), if the count of the counter 1235 is <17 the signal C=1 is set in the flip-flop 1231 with the signal $\phi6=1$ and the counter 1235 is incremented with the signal $\phi7=1$, and if the count of the counter is $\geq 17$ and <29 the signal P=1 is set in the flip-flop 1232 with the signal $\phi6=1$.

In sample frame 22, for each off-hook channel (the signal OFF HOOK=1 on the line 114), if the count of the counter 1235 is <17 the signal C=1 is set with the signal $\phi6=1$ and the counter is incremented with the signal $\phi7=1$. Similarly, in sample frame 23, for each echo channel (the signal ECHO=1 on the line 112), if the count of the counter 1235 is <17 the signal C=1 is set with the signal $\phi6=1$ and the counter is incremented with the signal $\phi7=1$.

These further sequences ensure that at least 17 channels in the desired order of priority, are assigned continuous transmission, and that if fewer than 29 channels are assigned continuous transmission then background noise channels (or at least those which have not been assigned continuous transmission in order to have 17 continuous channels) are assigned partial Transmission (C=0, P=1).

Thus at the end of sample frame 23 the counter 1235 has a count of at least 17 and not more than 29, representing the number of channels assigned continuous transmission in the next superframe. This count, and the signals X1 and X2 representing the determined number of bits per word, are supplied to inputs of the PROM 1236 which produces at its output the resultant number NAV of words available in each of frames 2 to 28 of the following DSI superframe for the partial transmission of b.n. channels. This number NAV can be from 0 (no partial transmission) to 12.

Figure 12D:
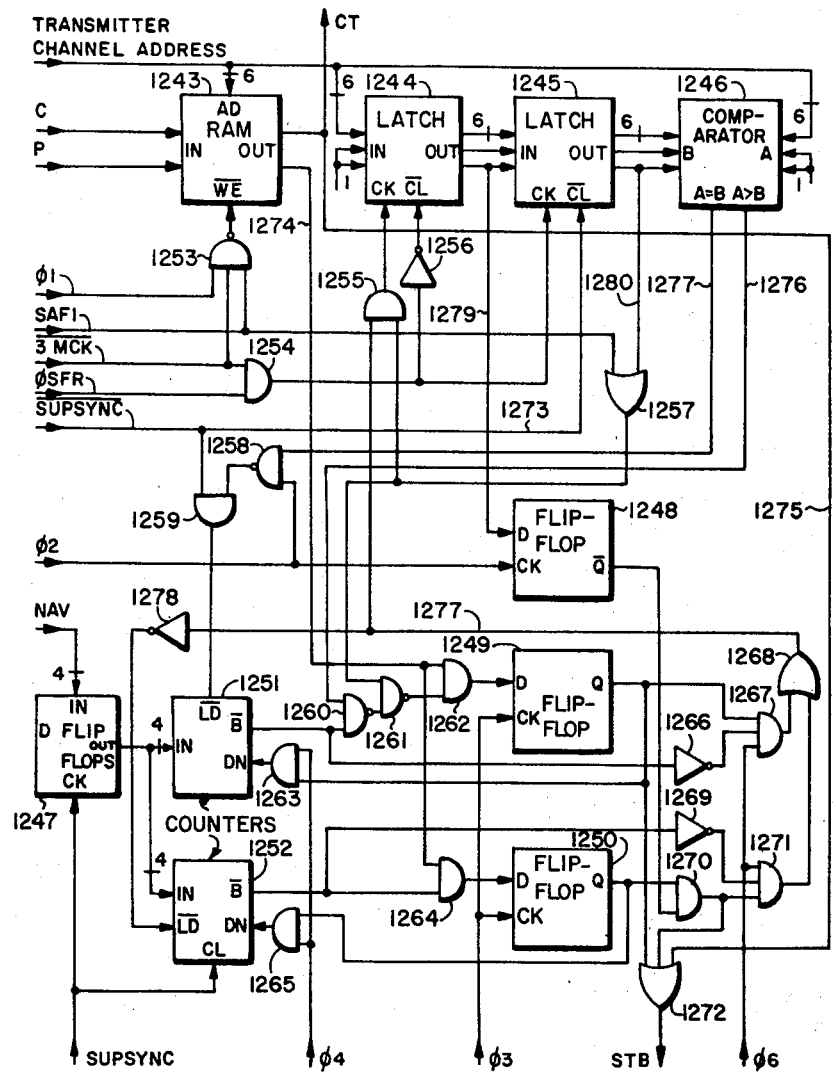

FIG. 12D illustrates a cyclic assignment unit of the assignment control unit 104, for producing a signal STB which is supplied to the encoder and buffer 103 in FIG. 1. The signal STB=1 is produced in synchronism with the relevant channel address, whenever an information word of a channel is to be transmitted. Thus for each channel which is to be transmitted continuously, the signal STB=1 must be produced for the channel in each sample frame. For each channel which is to be transmitted partially, the signal STB=1 must be produced for the channel in only those sample frames for which the channel's information is to be transmitted. The cyclic assignment unit consists of a 48-channel by 2-bit RAM 1243, two 8-bit latches 1244 and 1245, an 8-bit comparator 1246, D flip-flops 1247, 1248, 1249, and 1250, two 4-bit down counters 1251 and 1252, and gates and inverters 1253 through 1272 and 1278.

The operation of the cyclic assignment unit is best understood by considering a specific example. For example, it is assumed that for a particular superframe it has been determined that 26 active channels are to be transmitted continuously and 5 b.n. channels are to be transmitted partially. Then 6 bits per word will be used, and NAV=29−26=3 words will be available in each of the DSI frames 2 to 28 for the partial transmission of the b.n. channels. Suppose that these b.n. channels have the channel addresses equivalent to 5, 10, 20, 30, and 40.

At the start of the superframe, the signal SUPSYNC clocks the number NAV into the flip-flops 1247 and clears the counter 1252 via its clear input CL, and the latch 1245 is cleared by the signal $\overline{\text{SUPSYNC}}$ being applied to its clear input $\overline{\text{CL}}$ via a line 1273. The signal $\overline{\text{SUPSYNC}}$ is also conducted via the gate 1259 to the load input $\overline{\text{LD}}$ of the counter 1251, which is therefore loaded with the number NAV=3 from the flip-flops 1247.

During sample frame 1 the signal SAF1=1 enables the gate 1253 whose output is connected to the write enable input $\overline{\text{WE}}$ of the RAM 1243. Consequently, for each channel address, the signals C and P of the channel applied to inputs of the RAM 1243 are written into the RAM with the signals $\phi1=1$ and the clock $\overline{\text{3MCK}}=1$, are available at the outputs of the RAM as a signal CT and a signal on a line 1274, respectively. The signal CT is supplied to the encoder and buffer 103 in FIG. 1 and also via a line 1275 to the OR gate 1272 whose output is the signal STB. Thus for each channel for which C=1, in each frame the signal CT=1 and hence the signal STB=1 is produced to provide for continuous transmission of the channel.

The comparator 1246 compares the 8-bit output of the latch 1245 (input B) with the 6-bit channel address supplemented by most-significant bits which are logic 1 (input A), and consequently produces a logic 1 on a line 1276 via its output A>B. At this time the borrow outputs $\overline{B}$ of the counters 1251 and 1252 are respectively 1 and 0, because the counters have respectively non-zero and zero counts. Consequently the gate 1260 produces a 0 output so that the gate 1261 produces a 1 output to enable the gate 1262, and the gate 1264 is inhibited. When the channel address is 5, i.e. for the first b.n. channel, the stored signal P=1 produces a 1 on the line 1274, and hence a 1 at the output of the gate 1262, so that with the signal $\phi3=1$ the flip-flop 1249 is set so that its output Q=1. This output is connected to the OR gate 1272 so that the signal STB=1 is produced, and also enables the gate 1263 so that with the signal $\phi4=1$ the count of the counter 1251 is reduced by 1, to 2, via its input DN. For the next channel P=0, so that the output of the gate 1262 returns to 0, the flip-flop 1249 is reset, and the signal STB=0 is produced.

The signal STB=1 is similarly produced for the channel addresses 10 and 20. With the channel address 20 and the signal $\phi4=1$ the count of the counter 1251 is reduced to 0 so that its $\overline{B}$ output becomes 0 to enable the gate 1267 via the inverter 1266. In consequence, with the signal $\phi6=1$ the gate 1267 produces a 1 output, so that the gate 1268 also produces a logic 1 on a line 1277. As the signal SAF1=1 is conducted via the OR gate 1257 to enable the gate 1255, the logic 1 on the line 1277 is conducted via this gate to the clock input CK of the latch 1244 to cause the current channel address, 20, and two most significant 1 bits, to be entered into the latch 1244. This latched channel address is referred to as the latch point. The logic 1 on the line 1277 is inverted by the inverter 1278 whose output is connected to the load input $\overline{\text{LD}}$ of the counter 1252, which is consequently loaded with the count NAV=3 so that its output $\overline{B}$ becomes 1 to enable the gate 1264. The logic 0 now produced at the output $\overline{B}$ of the counter 1251 inhibits the gate 1260, so that the gate 1261 produces a 0 output to block the gate 1262.

With the next signal $\phi2=1$, the most significant bit 1 now present in the latch 1244 and produced on a line 1279 is clocked into the flip-flop 1248, whose output $\overline{Q}$ consequently becomes 0 to block the gate 1270. When the channel address reaches 30, i.e. for the next b.n. channel, the 1 on the line 1274 sets the flip-flop 1250 which via the gate 1265 causes the count of the counter 1252 to be reduced by 1 to 2, but because the gate 1270 is blocked the signal STB is 0, i.e. this channel is not transmitted in respect of this sample frame. The same situation occurs for the channel address 50, the count of the counter 1252 being reduced to 1.

At the start of the second sample frame the output of the gate 1254 becomes 1 to clock the contents of the latch 1244, i.e. the latch point, into the latch 1245 and to clear the latch 1244 via the inverter 1256. The most significant bit output of the latch 1245, present on a line 1280, is therefore 1 so that the output of the gate 1257 is 1. The line 1279 becomes 0 so that with the next signal $\phi2=1$ the flip-flop 1248 is reset and the gate 1270 is enabled. The comparator outputs on the lines 1276 and 1277 are both 0 because the current channel address is initially less than the latch point, input B of the comparator.

With the channel address 5, the signal on the line 1274 becomes 1 to set the flip-flop 1250 and reduce the count of the counter 1252 to 0. The Q=1 output of the flip-flop 1250 is now conducted via the gate 1270 to enable the gate 1271 and to produce the signal STB=1 via the gate 1272. The output $\overline{B}$ of the counter 1252 is now 0 so that the gate 1271 produces a 1 output to produce a 1 on the line 1277 via the OR gate 1268. In the same manner as described above, this causes the counter 1252 to be loaded with the count NAV=3, the current channel address, 5, to be loaded into the latch 1244 as a new latch point, and the flip-flop 1248 to be set to block the gate 1270. Consequently the signal STB=1 is not produced for the channel address 10.

When the channel address reaches 20, the comparator 1246 determines that A=B and produces a 1 on the line 1277. With the signal $\phi2=1$, the gate 1258 now produces a 0 output which via the gate 1259 causes the count NAV=3 to be loaded into the counter 1251, so that its output $\overline{B}$ becomes 1. The signal STB=1 is not produced for this channel address, however, because the signal on the line 1276 is still 0 to block the gate 1260. For each of the channel addresses 30 and 40 the signal on the line 1276 is 1 so that in each case the signal STB=1 is produced and the count of the counter 1251 is reduced by 1, so that at the end of sample frame 2 the counter 1251 has a count of 1.

At the start of sample frame 3 the latch point, 5, is entered into the latch 1245 and the latch 1244 is cleared, so that the flip-flop 1248 is reset. For the channel address 5 the signals on the lines 1277 and 1276 are respectively 1 and 0, so that the counter 1251 is loaded with the count NAV=3 and the signal STB=0 is produced. For the channel addresses 10, 20, and 30 the signal STB=1 is produced and the count of the counter 1251 is reduced by 1 each time to reach 0, so that the latch point 30 is entered into the latch 1244 and the counter 1252 is loaded with the count NAV=3. The operation of the unit in the remainder of the superframe continues as described above.

It can be seen, therefore, that in the successive sample frames the signal STB=1 is produced for the following b.n. channel addresses, and hence in the subsequent frames of the DSI superframe the following channels are transmitted:

| Sample Frame | Background Noise Channel | | | | |
|---|---|---|---|---|---|
| 1 | 5, | 10, | 20 | | |
| 2 | 5, | | | 30, | 40 |
| 3 | | 10, | 20, | 30 | |
| 4 | 5, | 10 | | | 40 |
| 5 | | | 20, | 30, | 40 |
| . | | | | | |
| . | | | | | |
| . | | | | | |

Thus the b.n. channels are transmitted by cyclic assignment. A similar cyclic assignment unit in the receiver keeps track of which channels are being transmitted in which frames. In the receiver, in each frame, the information of b.n. channels which have not been transmitted is constituted by repeating the previously transmitted information for that channel, i.e. by zero-order prediction, or by zero substitution or linear prediction.

The manner of operation of the cyclic assignment unit for other combinations of b.n. channels and quantities NAV will be clear from the preceding description. In this respect it will be noted that, in the special case when $Np \leq NAV$, each b.n. channel will be transmitted in each of frames 2 to 28 of the DSI superframe. However, for convenience of description this special case is still regarded as being a partial transmission situation, not a case of continuous transmission.

ENCODER AND BUFFER

The encoder and buffer 103 is illustrated in detail in FIGS. 13A, B, and C, FIG. 13A illustrating an NIC encoder, FIG. 13B illustrating selection and zero code suppression circuits, and FIG. 13C illustrating buffer and control circuits. Referring to FIG. 13A, the encoder serves to encode 8-bit PCM information present on the lines 102 into, selectively, 6- or 7-bit NIC information of which the sign bit is produced on a line 1301, the remaining 5 or 6 bits are produced on six lines 1302, and related 3-bit maximum segment information is produced on three lines 1303. The encoder has a similar form to the 6-bit NIC encoder described in Duttweiler at al. U.S. Pat. No. 3,945,002 issued Mar. 16, 1976, except that it is selectively operable for 6 or 7 bit NIC encoding.

The encoder consists of a delay unit 1304, which is constituted by 8 1296-bit-long shift registers and provides a delay of 1 superframe, two 48-channel by 3-bit RAMs 1305 and 1306, a 3-bit down counter 1307, two 3-bit comparators 1308 and 1309, a shift register 1310, gates 1311 through 1318, and an inverter 1319.

With the signal $\phi 4 = 1$ in sample frame 1 of each superframe, via the gates 1311 and 1312 the RAM 1305 is enabled to store the three most significant bits, other than the sign bit, of the 8-bit PCM word on the lines 102 for each channel. As is known, each 8-bit PCM word comprises a sign bit s, three segment information bits a, b, and c, and four interval bits w, s, y, and z. Accordingly, in sample frame 1 the segment information of each channel is entered into the RAM 1305. Assuming initially that the signal $\overline{7B}$ is 1 so that the AND gate 1313 is enabled for each channel, in each other sample frame of the superframe the stored segment information is compared in the comparator 1309 with the current segment information of the channel and, if the latter is greater, this is written into the RAM 1305. At the end of the superframe, therefore, the maximum segment information of each channel during the superframe is present in the RAM 1305, and for each channel this information is entered into the RAM 1306 in sample frame 1 of the next superframe with the signal $\phi 1 = 1$.

During each sample frame of this next superframe, for each channel, with the signal $\overline{\phi 1} = 1$ the maximum segment information is loaded into the down counter 1307 whose count is compared by the comparator 1308 with the actual segment information of the channel which, being part of the delayed 8-bit PCM information on lines 1320, has been delayed by one superframe by the delay unit 1304. With the signal $\phi 1 = 1$ the mode control inputs S0 and S1 of the shift register 1310 are both 1 to cause the information at the parallel inputs of the register to be loaded into the register. This information is constituted by the output of the gate 1318, the delayed interval information bits w, x, y, and z of the channel, and the delayed bit c of the channel. If the count, initially equal to the maximum segment information, in the counter 1307 is greater than the actual segment information and has a 1 in either of its two most significant bit positions, then the gate 1316 produces a 0 output to enable counting of the counter 1307. At the same time, shifting of the shift register 1310 is enabled by its mode control inputs S0 and S1 being respectively 1 and 0, the signal $\overline{\phi 1}$ now being 1. Accordingly, the counter 1307 counts down pulses of the clock 6MCK, and shifting (in a downward direction as illustrated in FIG. 13A) is simultaneously effected in the shift register 1310, until the output of the gate 1316 becomes 1 when further counting and shifting are inhibited.

The above 6-bit NIC encoding operation has been described only briefly, since it is known and described more fully for example in U.S. Pat. No. 3,945,002 already referred to. The 6-bit NIC encoding, and corresponding decoding in the receiver, is effected in accordance with the table given in FIG. 4 of that patent. In the case of 7-bit NIC encoding, the signal $\overline{7B} = 0$ so that the output of the AND gate 1313 is always 0. Thus the least significant bit of the 3-bit maximum segment information is always 0 in this case. Apart from this, the operation of the encoder is described above. The encoding and decoding operations in this case are illustrated by the following table:

| Maximum Segment Information | 8-bit PCM Word | 7-bit NIC Word | Reconstructed 8-bit PCM Word |
|---|---|---|---|
| 11(0) | s111wxyz | s1wxyz1 | s111wxyz |
| | s110wxyz | s1wxyz0 | s110wxyz |
| | s101wxyz | s01wxyz | s101wxyz |
| | s100wxyz | s001wxy | s100wxy1 |
| | s011wxyz | s0001wx | s011wx10 |
| | s010wxyz | s00001w | s010w100 |
| | s001wxyz | s000001 | s0011000 |
| | s000wxyz | s000000 | s0001000 |
| 10(0) | s101wxyz | s1wxyz1 | s101wxyz |
| | s100wxyz | s1wxyz0 | s100wxyz |
| | s011wxyz | s01wxyz | s011wxyz |
| | s010wxyz | s001wxy | s010wxy1 |
| | s001wxyz | s0001wx | s001wx10 |
| | s000wxyz | s0000wx | s000wx10 |
| 01(0) | s011wxyz | s1wxyz1 | s011wxyz |
| | s010wxyz | s1wxyz0 | s010wxyz |
| | s001wxyz | s01wxyz | s001wxyz |
| | s000wxyz | s00wxyz | s000wxyz |
| 00(0) | s001wxyz | s1wxyz1 | s001wxyz |

| Maximum Segment Information | 8-bit PCM Word | 7-bit NIC Word | Reconstructed 8-bit PCM Word |
|---|---|---|---|
| | s000wxyz | s0wxyz0 | s000wxyz |

Referring now to FIG. 13B, the selection and zero code suppression circuits comprise two selectors 1321 and 1322, each of which has groups of inputs A and B and a select input SL. Each selector connects its A inputs to its outputs if its input SL=0 and connects its B inputs to its outputs if its input SL=1. The selector 1321 has the signal 8B applied to its input SL, and the selector 1322 has the signal CT applied to its input SL. The zero code suppression circuitry is constituted by the gates shown in FIG. 13B but not referenced; these gates are controlled by the signals 7B and 6B and provide for zero code suppression by ensuring that, in each word, the least significant code bit is set to 0 if all of the bits of the word are 1. The connections of the lines 1320 to the inputs A of the selector 1322 are arranged to provide for the partial transmission of channels with 7 or 6 bits to be in compact PCM (CPCM) format, in which the second bit, or second and third bits, respectively, of the PCM word are not transmitted and are set to 0 in the receiver.

From the illustration in FIG. 13B and the above description it will be appreciated that for partially transmitted channels (CT=0), and for continuously transmitted channels (CT=1) when 8 bits per word are used, the delayed PCM information on the lines 1320 is coupled to the output lines 1323, and for continuously transmitted channels (CT=1) when 6 or 7 bits per word are used (the signal 8B=0) the sign bit on the line 1301 and the NIC information on the lines 1302 are coupled to the output lines 1323.

The buffer and control circuits illustrated in FIG. 13C serve to buffer the information on the lines 1303 and 1323 which is to be transmitted to the timing of the DSI superframe. To this end, the circuits in FIG. 13C comprise a first-in first-out (FIFO) store 1324 and a 3-bit parallel-to-serial converter 1325 for the NIC segment information on the lines 1303, a 3-page inverting RAM 1326 and an 8-bit parallel-to-serial converter 1327 for the information on the lines 1323, and associated gates 1328 through 1331. The circuits also comprise a 6-bit write address counter 1332, a 2-bit write page counter 1333, a 6-bit read address counter 1334, a 2-bit read page counter 1335, an 8-bit page and address selector 1336, a flip-flop 1337, and gates and inverters 1338 through 1349.

In each superframe, in sample frame 1 (SAF1=1) for each continuous channel which is to be transmitted (CT=1), with the signal $\phi 2=1$ the gate 1328 supplies a 1 to an input-enable input SI of the store 1324, to cause the 3-bit maximum segment information of the channel on the lines 1303 to be entered into the store. In frame 1 of the DSI superframe, with the signal LNIC shown in FIG. 3 applied to an output-enable input SO of the store 1324 and to an input-enable input SI of the converter 1325, the 3-bit maximum segment information of each channel to be continuously transmitted, in turn, is transferred from the store 1324 to the converter 1325, into which it is loaded in parallel form and where it is converted into serial form under the control of the clock 1.5MCK applied to a clock input CK of the converter. The serial information at the output of the converter 1325 is inverted by the gate 1330, which is enabled by the signal NICEN=1 at this time, and conducted via the gate 1331 to the line 107 and thence to the signal combiner 105 in FIG. 1, the gate 1331 being enabled at this time by the signal $\overline{DATAEN}=1$ conducted via the gate 1329.

Writing into and reading from the RAM 1326 are effected in dependence upon the output of the gate 1339 at a page and address of the RAM determined by the counts of the write counters 1332 and 1333 and the read counters 1334 and 1335, the respective counts being selectively applied to a chip enable input $\overline{CE}$ of the RAM for page selection and an address input AD of the RAM for address selection via the selector 1336 which is controlled via its select input SL by the output of the gate 1341.

Writing into the RAM 1326 is effected if the output of the gate 1339 is 0. This is the case for each channel in each sample frame when $\overline{\phi 5}=0$ or $\overline{\phi 7}=0$, if the signal STB=1 has been produced for the channel and if the signal LDATA=0. It will be recalled that the signal STB=1 is produced whenever an information word of a channel in the current sample frame is to be transmitted. The production of this signal sets the flip-flop 1337, so that its output $\overline{Q}=0$. When the output of the gate 1339 is 0 for write-in, the gates 1340 and 1341 consequently also have 0 outputs so that the selector 1336 supplies to the RAM the write page and address from the counters 1333 and 1332 respectively. After each write-in, with the output Q=1 from the flip-flop 1337 and the signal $\phi 8=1$ applied to the gate 1343, the count of the counter 1332 is increased by one via the gate 1342. At the end of each sample frame, with the signal $\phi SFR=1$, the counter 1332 is cleared via the inverter 1344 and the page counter 1333 is incremented.

The signal LDATA controls reading from the RAM 1326. Throughout the first frame of the DSI superframe the signal LDATA=0, this frame being provided for the overhead information as already described. In each of frames 2 through 28 of the DSI superframe the signal LDATA has one of the forms shown at the bottom of FIG. 3, the timing signal generator 123 in FIG. 1 producing the signal LDATA with 22, 25, or 29 evenly spaced pulses in each frame depending upon the number of bits per word, 8, 7, or 6 respectively, which the assignment control unit 104 has determined be used throughout the superframe. With the signal LDATA=1, via the gate 1339 the RAM is controlled for reading and via the gates 1340 and 1341 the selector 1336 is caused to supply the read page and address from the counters 1334 and 1335 to the RAM. The signal LDATA is also supplied to a load input LD of the converter 1327 so that the 8 bits which are read out in inverted form from the RAM 1326 are entered into the converter 1327, at the output of which they are produced serially under the control of the clock 1.5MCK and conducted via the gates 1329 and 1331 to the line 107. If 8 bits per word are being used, all 8 bits will be conducted to the line 107. However, if only 7 or 6 bits per word are being used, then loading of the next word into the converter 1327 in response to the next signal LDATA=1 occurs after only 7 or 6 bits, respectively, have been produced at the output of the converter 1327.

The read address counter 1334 is incremented after each signal LDATA=1 via the inverter 1346. At the end of each frame of the DSI superframe, with the signal $\phi FT=1$, the counter 1334 is cleared by the output of the gate 1347 and the read page counter is incremented via the inverter 1348. The page counters 1333 and 1335 count cyclically each through three states to select one of the three pages of the RAM 1326 in turn. In order to maintain a proper spacing between the irregular writing into and reading from the RAM, via the gate 1345 the counter 1333 is cleared with the signal SUPSYNC=1 at the start of each superframe, so that it selects the first, second, and third pages of the RAM sequentially in turn. In contrast, with the signal SUPDSI=1 at the start of each DSI superframe, via the gate 1349 the counter 1335 is preset to a fourth state in which no page of the RAM is selected. This inhibits reading from the RAM in the first frame of the DSI superframe. The signal $\phi FT = 1$ causes the counter 1335 to select the first, second, and third pages of the RAM sequentially in turn throughout the remaining 2nd to 28th frames of the DSI superframe.

OUTPUT SIGNAL COMBINER

The output signal combiner 105 in FIG. 1 serves to combine the signals on the lines 106, 107, and 108, and to this end can be constituted simply by appropriate gating circuitry. The combiner also serves to produce and combine with these signals the signalling, error-checking, and alarm indication bits already referred to, and to convert the DSI signal into a bipolar form suitable for transmission. As signal combining circuits providing these functions are well known to those skilled in the art, no further description thereof is believed to be necessary here.

RECEIVER

A block diagram of a DSI receiver which can be used in cooperation with a transmitter as described above is shown in FIG. 14. The receiver comprises an interface and timing extractor unit 1401, a decoder 1402, an assignment store 1403, a signalling information control unit 1404, a data buffer 1405, an offset remover and averaging circuit 1406, and two desynchronizers 1407 and 1408, one for each of the two digroups. The received DSI signal is supplied via a line 1409 to the unit 1401, which produces timing signals for supply to the other units of the receiver via lines 1410, and extracts destuffing information and supplies this via lines 1411 to the desynchronizers. The unit 104 extracts the signalling bits from the DSI signal and supplies these via lines 1412 to the desynchronizers. Data in the DSI signal is decoded by the decoder 1402 and assignment information is extracted from the DSI signal and stored by the assignment store 1403, and from the decoded data and assignment information the data of the two digroups is reconstructed by the data buffer 1405. The data output from the buffer 1405 is separated into the two digroup outputs by the desynchronizers 1407 and 1408, which also effect destuffing and reconstruct the clock frequencies corresponding to the digroup inputs to the transmitter. The circuit 1406 produces the receiver average RA for each channel on lines 1413 in the same manner as the corresponding circuit 116 in the transmitter, and the sign bit of each channel is supplied to the transmitter directly from the output of the data buffer 1405 via a line 1414. Thus the lines 1413 and 1414 correspond to the lines 118 and 120 respectively in FIG. 1.

As the operation of the transmitter has been described fully, and the receiver operates conversely, a detailed description of all of the parts of the receiver is not included here. However, the manner in which reconstruction in the receiver of the clock frequency for each digroup is achieved is not apparent from the operation of the transmitter, and accordingly this is described below with reference to FIG. 15. This also forms the subject of our copending U.S. patent application Ser. No. 187,815 filed concurrently herewith. This reconstruction for each digroup entails establishing frequency synchronism between the digroup input to the transmitter and the digroup output from the receiver, and is rendered difficult by the relatively low stuffing rate.

Referring to FIG. 15, the receiver includes a clock inhibit circuit 1501, an inverter 1502, and a ÷27 frequency divider 1503 which are common to the two desynchronizers 1407 and 1408. The remaining parts shown in FIG. 15 are provided individually in each of the desynchronizers. These remaining parts comprise a counter 1504; a programmable frequency divider constituted by a latch 1505, a counter 1506, and a D flip-flop 1507; a clock inhibit circuit 1508; a 4-page RAM, associated read and write address circuits, and a read/-write phase comparator, shown as a single unit 1509; a digroup framing circuit 1510; a voltage-controlled crystal oscillator (VCXO) 1511; a ÷193 frequency divider 1512; a gate 1513; two ÷16 frequency dividers 1514 and 1515; and a phase comparator 1516.

The unit 1401 in FIG. 14 produces a clock signal RCK, having the nominal DSI clock frequency of 1.544 MHz, a signal RS which comprises one pulse per superframe, and a destuffing command $\overline{DES}=0$ whenever destuffing is to be effected for the relevant digroup in the current superframe. The signal RCK is applied to the clock inhibit circuit 1501, which inhibits 24 clock pulses per superframe to provide on a line 1517 a clock signal CLK having 5208−24=5184 pulses per superframe, or an average frequency of 1.544×5184/4208=1.536885 MHz. Via its enable input $\overline{EN}$ and the ÷27 frequency divider 1503, the counter 1506 is enabled to count only 1 in 27 of the pulses of the signal CLK, and thus counts pulses at an average frequency of 1.536885 MHz÷27=56922 Hz. The frequency division factor, 27, of the frequency divider 1503 is selected to be equal to the number of sample frames in a superframe.

The signal CLK on the line 1517 is applied to the clock input CK of the clock inhibit circuit 1508, via which it is conducted unchanged when the signal $\overline{DES}=1$ to the unit 1509 to control the write into the RAM of the decoded data for the relevant digroup supplied from the output of the data buffer 1405. With each destuffing command $\overline{DES}=0$ the clock inhibit circuit 1508 is inhibited throughout the first frame of the superframe, this always being the stuffed frame, so that stuffed information is not written into the RAM. A reconstructed 1.544 MHz clock signal produced by the VCXO 1511 is supplied to a clock input CK of the framing circuit 1510, and is also supplied to the input of, and gated in the gate 1513 with the output of, the ÷193 frequency divider 1512, to produce at the output of the gate 1513 and on a line 1518 a reconstructed 1.536 MHz clock signal which controls read-out of the information stored in the RAM to the framing circuit 1510.

The required frequency synchronism of the VCXO 1511 is achieved by comparing in the phase comparator 1516 the phases of the outputs of the ÷16 frequency dividers 1514 and 1515, and controlling the frequency of the VCXO with the output of the phase comparator. The frequency divider 1514 frequency-divides the reconstructed clock signal on the line 1518 by 16 to produce an output signal at a nominal frequency of 96,000 Hz. The ÷16 frequency divider 1515 is arranged to frequency-divide the signal CLK on the line 1517 when it is enabled by the output Q of the flip-flop 1507. On average, the signal CLK has a frequency of 1,536,885 Hz and, as described below, the divider 1515 is arranged to be disabled at an average frequency of 885 Hz, so that the output of the divider is at an average frequency of (1,536,885−885)/16=96,000 Hz. In this average steady state, in which the phase comparator 1516 is supplied with inputs at the same frequency, there is no change in the VCXO frequency.

As already described, the unit 1509 includes a read/write phase comparator which, depending on the relative phases of reading from and writing into the RAM, produces a logic 1 or 0 at an output R/W PC and hence on a line 1519. The counter 1504 is a presettable 8-bit counter, to the 7 most significant presetting inputs of which the line 1519 is connected and to the least significant presetting input of which a logic 1 is supplied. The signal $\overline{\text{DES}}$ is supplied to a load input $\overline{\text{LD}}$ of the counter 1504, and the signal RS is supplied to its clock input CK. Thus with each destuffing command $\overline{\text{DES}}=0$ the counter is preset to the count 00000001 or 11111111 depending on the prevailing read/write phase in the RAM. Between successive destuffing commands the counter 1504 counts up pulses of the signal RS; i.e. the counter counts the number of superframes, modified by plus or minus 1 depending on the RAM read/write phase, between consecutive destuffing commands. Also with each destuffing command the latch 1505 is clocked to store the count reached by the counter 1504. The units 1505, 1506, and 1507 operate in known manner as a programmable frequency divider which divides the frequency of 56,922 Hz by a factor constituted by the count stored in the latch 1505, to produce at the Q output of the flip-flop 1507 the signal at an average frequency of 885 Hz for disabling the frequency divider 1515.

It will be recalled that, on average and based on nominal figures, there are 64.5 superframes between successive frame stuffings. Since only the first frame in each superframe can be stuffed, in fact consecutive frame stuffings may occur 64 or 65 superframes apart. The modified count reached by the counter will therefore be from 63 to 66. The output frequency of the programmable frequency divider will therefore be 56,922/63, 64, 65, or 66 Hz, or in the range from 862 to 903 Hz. On average, over a large number of successive frame stuffings, this frequency will be the 885 Hz referred to above so that a stable situation is reached.

In practice, it will be appreciated that the frequency of the VCXO will be stepped between different frequencies as a result of the variable frequency of the signal supplied from the flip-flop 1507 to the frequency divider 1515, each step occurring on the occurrence of a destuffing command. Typically the VCXO frequency may change by an absolute maximum of 64 Hz with a minimum duration of any particular frequency of 170 ms. This frequency jitter, together with a maximum of about 120 ns rms jitter due to the internal jitter of the desynchronizer, is believed to be insufficient to affect subsequently connected equipment such as channel banks, multiplexers, and digital switches.

The invention is of course not limited to the particular embodiment described above, and numerous modifications, variations, and adaptations may be made without departing from the scope of the invention as defined in the claims. In particular, and not by way of limitation, it is mentioned here that the invention is applicable to other timing, frame, and superframe formats, and to other encoding schemes. As just one example of such variations, it is observed that, instead of transmitting background noise channels partially by cyclic assignment using compact PCM encoding, as described above, they could be transmitted continuously with a reduced number of bits per word, for example using only one or two bits per word using adaptive PCM encoding. Numerous other possible variations will be self-evident to persons skilled in the art to which the invention relates.

What is claimed is:

1. A method of mitigating noise signal contrast in a multi-channel digital speed interpolation transmission system, comprising the steps of:
    determining each channel which is active and each channel which carries background noise;
    transmitting the active channels; and
    transmitting the channels which carry background noise with a resolution which is dependent upon the number of channels transmitted and which is reduced as said number is increased.

2. A method as claimed in claim 1 wherein said determining step comprises, for each channel, the steps of:
    detecting speech signals on a transmit path of the channel;
    determining whether the channel is in an off-hook state;
    detecting echoes on the transmit path of speech signals on a receive path of the channel;
    determining that the channel is active if speech signals which are not echoes are detected on the transmit path and the channel is in the off-hook state; and
    determining that the channel carries background noise if speech signals are not detected on the transmit path and the channel is in the off-hook state.

3. A method as claimed in claim 2 wherein, for each channel, the step of determining whether the channel is in the off-hook state comprises the steps of:
    detecting speech signals on the receive path of the channel; and
    determining that the channel is in the off-hook state in dependence upon the detection of speech signals on the transmit and receive paths during a preceding predetermined period.

4. In a multi-channel digital speech interpolation transmission system, the improvement comprising:
    means for determining each channel which carries background noise, in addition to each channel which is active; and
    means for transmitting, in addition to each active channel, each channel which carries background noise with a resolution which is dependent upon the number of channels transmitted and which is reduced as said number is increased.

5. A digital speech interpolation transmission system for transmitting a plurality of digital signal channels via a transmission link, comprising:
    means for forming superframes each comprising a plurality of multi-bit frames;
    means for determining, for each superframe, which channels are active and which channels carry background noise (b.n. channels); and
    means for transmitting, in a normal loading situation, a digital message in respect of each active channel in each of said frames of the superframe and digital messages in respect of the b.n. channels in said frames of the superframes, the transmitting means comprising:

means for determining for each superframe, in dependence upon the numbers of active channels and b.n. channels for that superframe, numbers of bits for the digital messages of each active channel and each b.n. channel;

means for producing said digital messages, each of the respective number of bits, from the digital signals of each active channel and each b.n. channel; and means for producing and transmitting, for each superframe, digital information relating to the transmission status of each channel, and the determined number of bits of each of the digital messages, in that superframe.

6. A system as claimed in claim 5 wherein said means for forming superframes is arranged to form each superframe with an additional, overhead information frame in addition to said plurality of frames, said digital information being transmitted in said overhead information frame of each superframe.

7. A system as claimed in claim 6 wherein the means for determining numbers of bits for the digital messages serves to determine a number of bits which is common to all of the digital messages in the relevant superframe, whereby a predetermined number of the digital messages each with the determined number of bits can be transmitted in each of said plurality of frames of the relevant superframe, said predetermined number being greater, in a normal loading situation, than the number of active channels, and wherein the means for transmitting the digital messages comprises means for transmitting the digital message of each active channel in each of said plurality of frames of the relevant superframe and for transmitting the digital messages of b.n. channels in the remaining available space in each of said plurality of frames, the transmission being effected cyclically for the b.n. channels throughout said plurality of frames of the relevant superframe.

8. A system as claimed in claim 7 wherein the means for producing the digital messages of each active channel from the digital signals of the channel comprises a nearly instantaneous companding (NIC) encoder for encoding the digital signals of each active channel in each superframe to produce a maximum segment digital value and a plurality of NIC encoded values, each NIC encoded value constituting a respective one of the digital messages of the active channel, and wherein the means for producing and transmitting said digital information comprises means for transmitting the maximum segment digital value of each active channel in the overhead information frame of the relevant superframe.

9. A system as claimed in claim 7 wherein the means for producing the digital messages of each b.n. channel from the digital signals of the channel comprises means for omitting one or more most significant magnitude bits from each digital signal to produce the respective digital message.

10. A system as claimed in claim 7 wherein said means for transmitting is responsive to an overload situation, in which the number of active channels is equal to or greater than the predetermined number of digital messages which can be transmitted in each of said plurality of frames with a predetermined minimum number of bits for each digital message, to transmit in the relevant superframe only said predetermined number of active channels with each digital message thereof having said predetermined minimum number of bits, b.n. channels not being transmitted in the superframe.

11. A system as claimed in claim 5 wherein said plurality of digital signal channels to be transmitted are derived from at least one source which is asynchronous to the timing of the transmission system, said system further comprising, for each such source, synchronizing means comprising:

a store;

means for writing the digital signals of the channels from the source sequentially into the store;

means for reading the digital signals of the channels sequentially from the store at a higher rate than that at which they are written into the store;

means for producing a stuffing command when the phase of reading from the store lags the phase of writing into the store by a predetermined amount;

means responsive to the stuffing command for inhibiting the sequential reading from the store of digital signals in respect of a predetermined frame of the superframe whereby said predetermined frame is stuffed;

means for transmitting the stuffing command as part of said digital information to identify the superframe including the stuffed frame; and means at a receiver of the system for reconstructing the timing of the asynchronous source and responsive to the stuffing command to ignore the stuffed information in said predetermined frame.

12. A system as claimed in claim 5 wherein the means for determining which channels are active and which channels carry background noise comprises:

a speech detector for detecting speech signals on a transmit path, for each channel for each superframe;

an off-hook detector for determining for each channel, for each superframe, whether the channel is in an off-hook state;

an echo detector for detecting, for each channel for each superframe, signals on the transmit path which are echoes of signals on a receive path; and gating means for producing, for each channel for each superframe, a signal representing that the channel is active if speech signals which are not echoes are detected on the transmit path and the channel is in the off-hook state, and a signal representing that the channel carries background noise if speech signals are not detected on the transmit path and the channel is in the off-hook state.

13. A system as claimed in claim 12 wherein the off-hook detector comprises means for detecting speech signals on a receive path, for each channel for each superframe, and means responsive, for each channel, to a plurality of consecutive detections of speech signals for the channel, by said speech detector or by said means for detecting speech signals, occurring within a preceding predetermined number of superframes to produce a signal representing that the channel is in the off-hook state.

14. A system as claimed in claim 12 and including means for producing, for each superframe, from the digital signals of the channels an average signal for each channel, said detectors each being responsive to the average signal for each channel.

* * * * *